(12) United States Patent
Webb et al.

(10) Patent No.: US 9,612,506 B1
(45) Date of Patent: Apr. 4, 2017

(54) CAMERA SUPPORT

(71) Applicants: Michael Webb, Haleiwa, HI (US);
Keyan Webb, Haleiwa, HI (US)

(72) Inventors: Michael Webb, Haleiwa, HI (US);
Keyan Webb, Haleiwa, HI (US)

( * ) Notice: Subject to any disclaimer, the term of this patent is extended or adjusted under 35 U.S.C. 154(b) by 44 days.

(21) Appl. No.: 14/626,857

(22) Filed: Feb. 19, 2015

Related U.S. Application Data

(60) Provisional application No. 61/941,728, filed on Feb. 19, 2014, provisional application No. 61/937,535, filed on Feb. 8, 2014.

(51) Int. Cl.
*H04N 5/225* (2006.01)
*G03B 17/56* (2006.01)

(52) U.S. Cl.
CPC ......... *G03B 17/561* (2013.01); *H04N 5/2251* (2013.01)

(58) Field of Classification Search
CPC .. F16M 13/00; F16M 13/04; F16M 2200/041; H04N 5/2254; H04N 7/181; A61B 1/00177; A61B 1/04; B60R 2011/0082; B60R 2011/0089; G01J 3/0202; G01J 3/0272; G01J 3/0289; G03B 17/561; G03B 17/563
See application file for complete search history.

(56) References Cited

U.S. PATENT DOCUMENTS

| 5,275,364 | A | | 1/1994 | Burger | |
|---|---|---|---|---|---|
| 5,601,356 | A | * | 2/1997 | McWilliams | ............. A45F 5/00 224/221 |
| 6,764,231 | B1 | | 7/2004 | Shubert | |
| 6,839,856 | B1 | * | 1/2005 | Fromm | ................. G06F 13/124 365/220 |
| 6,899,255 | B2 | | 5/2005 | Pringle | |
| 6,955,484 | B2 | | 10/2005 | Woodman | |
| 7,217,044 | B1 | * | 5/2007 | Marks, Jr. | .............. F16M 11/06 348/376 |
| 8,016,492 | B2 | | 9/2011 | Pyle | |
| 8,150,248 | B1 | | 4/2012 | Woodman | |
| 8,328,359 | B2 | * | 12/2012 | Monroe | ................. F16M 11/14 348/376 |
| 8,413,936 | B2 | | 4/2013 | Wang | |
| 8,534,933 | B2 | | 9/2013 | Sherwood | |
| 2004/0262342 | A1 | * | 12/2004 | Pringle | ..................... A45F 5/00 224/221 |
| 2006/0262274 | A1 | | 11/2006 | Brown | |
| 2008/0117328 | A1 | * | 5/2008 | Daoud | ................... F16M 11/10 348/373 |
| 2009/0277068 | A1 | | 11/2009 | Lamar | |
| 2012/0207463 | A1 | | 8/2012 | Sherwood | |

* cited by examiner

*Primary Examiner* — Trung Diep
(74) *Attorney, Agent, or Firm* — Nathaniel K. Fedde

(57) ABSTRACT

This invention provides a camera support comprising an arm; a camera mount connected to the arm; a mount configured for attachment to a first supportive base ('first base mount'), wherein the arm is pivotally connected to the first base mount; a mount configured for attachment to a second supportive base ('second base mount'); and an arm coupler configured for releasably connecting the arm from the second base mount. Optionally, the first and second base mounts comprise straps, e.g. for mounting to a user's limb such as a forearm. Exemplary embodiments allow the arm to swing smoothly in a downward motion directly into the palm of the user's hand.

22 Claims, 25 Drawing Sheets

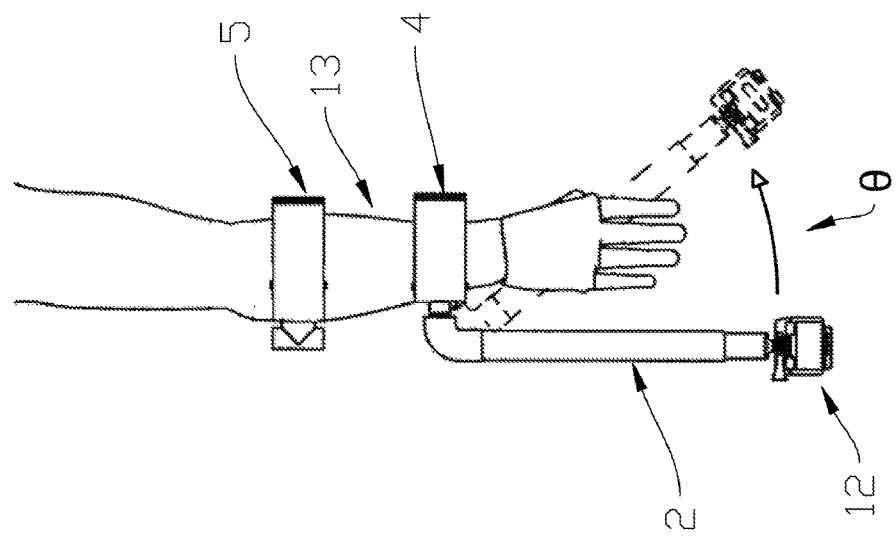
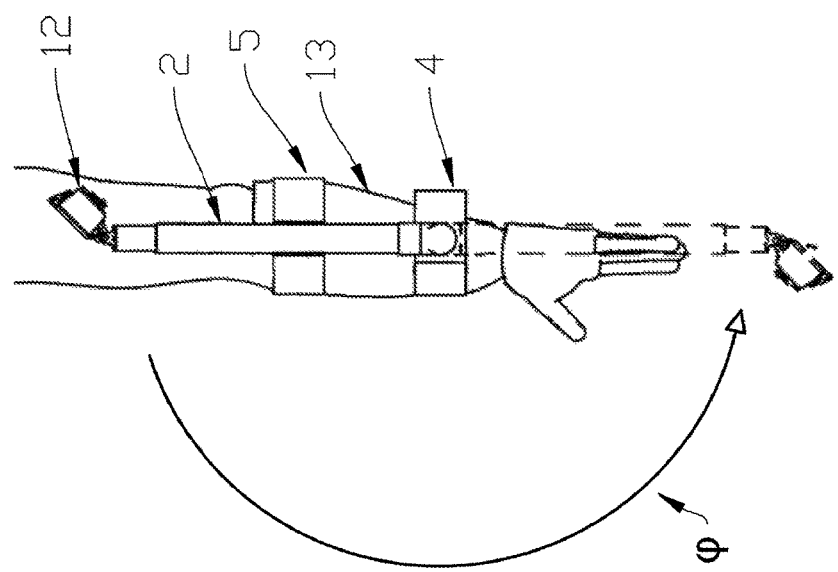
Fig. 3B
Fig. 3A

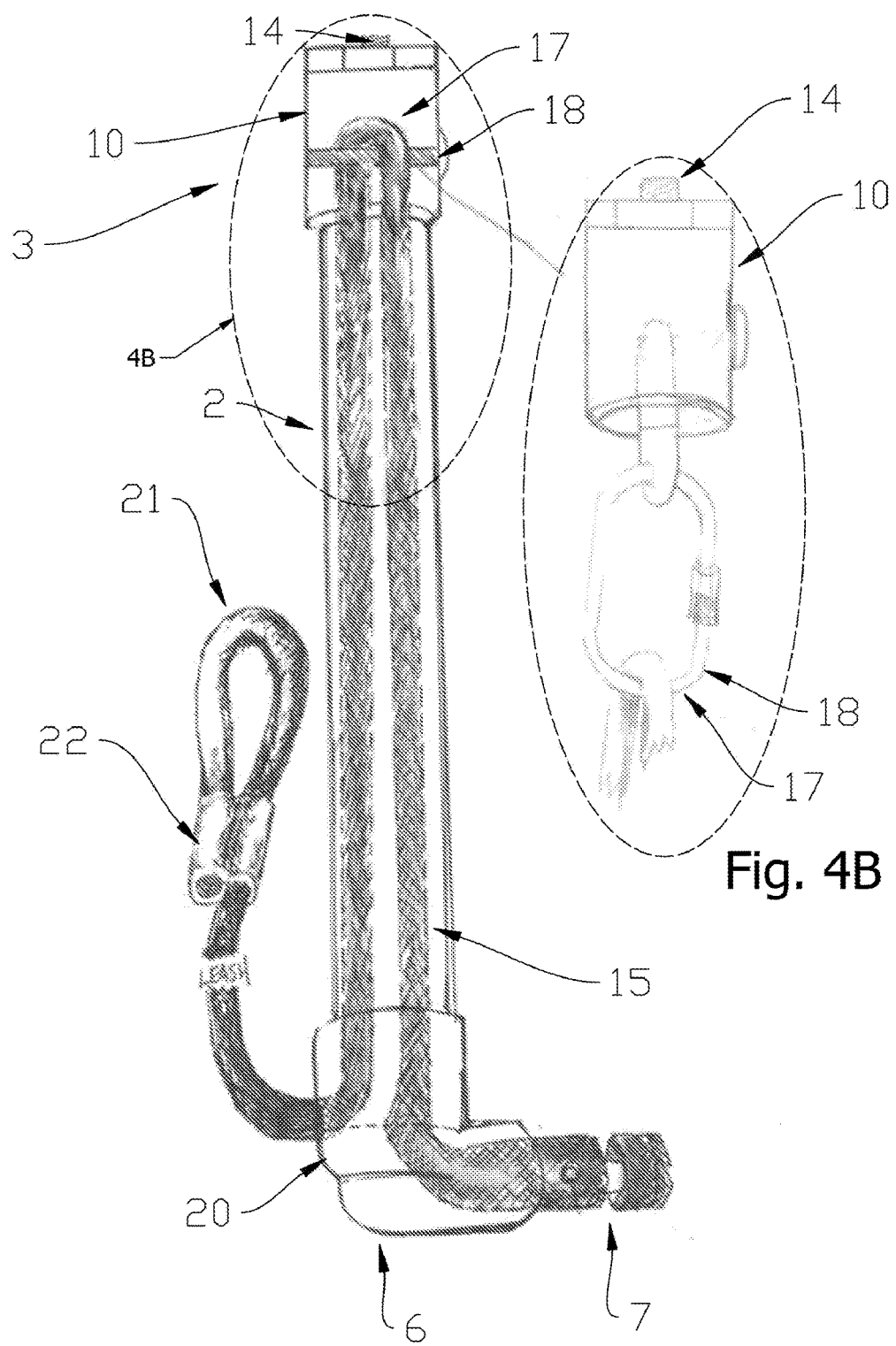

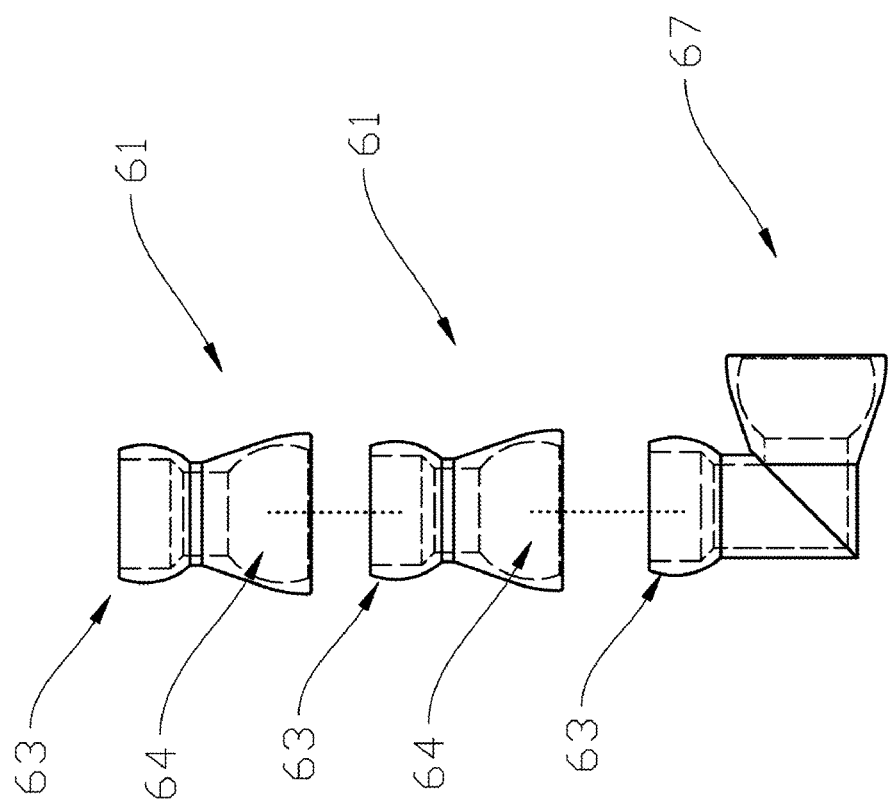

CAMERA SUPPORT

CROSS-REFERENCE TO RELATED APPLICATIONS
TECHNICAL FIELD
SUMMARY OF THE INVENTION
BRIEF DESCRIPTION OF THE DRAWINGS
DETAILED DESCRIPTION OF THE INVENTION
Joints
Arm
  Axes of Movement
  Arm Shape
  Modular Camera Support
  Materials
Elbow
Camera Mount
  Mounting Mechanisms
  Camera Joints
  Materials
Base Mounts
  Mounting Mechanisms
  First Base Mount
  Second Base Mount
  Supportive Bases
  Materials
Leash
  Camera Remote
Camera
Methods of Use
Example Embodiments
EXAMPLES
  Example 1 Camera Support
  Example 2 Axes of movement
  Example 3 Method of use
  Example 4 Camera support with leash
  Example 5 Camera Support
  Example 6 Superior Properties
  Example 7 Arm Coupler
  Example 8 Arm comprising segments and arm segment joints
  Example 9 Arm comprising segments, arm segment joints, and a leash
  Example 10 Quick connector
  Example 11 Camera Support
CLAIMS
ABSTRACT
DRAWINGS

CROSS-REFERENCE TO RELATED APPLICATIONS

This application claims the benefit of U.S. Provisional Application No. 61/937,535, filed 8 Feb. 2014 and U.S. Provisional Application No. 61/941,728, filed 19 Feb. 2014.

TECHNICAL FIELD

The present invention relates to camera supports.

BACKGROUND OF THE INVENTION

The popularity of self-recorded videos has increased tremendously as high quality video cameras have become increasing smaller and users often wish to record their experiences during fast-paced action sports. One problem is that action sports require the user to use both hands at times and the user cannot carry a handheld camera in-hand. For example, board sports such as surfing, snowboarding, and skateboarding require the user's hands for balance. In surfing, the problem is compounded further as surfing requires full use of the user's hands while paddling in the water. Accordingly, it is a challenge for user's to carry a hand held camera in an action environment.

To circumvent this problem, board-mounted cameras and helmet-mounted cameras have been developed that allow hand's free operation of camera. However, these cameras allow only a single point of view (POV) which prevents user's from capturing the full experience of their activities. Many attempts have been made to improve the quality and experience of self-recorded videos but all have fallen short of meeting the needs of the action sports community.

U.S. Pat. No. 8,534,933 describes a system for storing and releasing a camera. The system has a wrist strap to which a camera can be hinged. The system merely provides a mechanism to fold the camera on the user's wrist when not in use and provides only first person POV.

U.S. Pat. No. 8,016,492 describes a wrist strap with hinged mount for camera. The device merely provides a mechanism to fold the camera on the user's wrist when not in use and provides only first person POV.

U.S. Pat. No. 7,273,321 describes a harness system for attaching camera to user. The device merely provides a mechanism to fold the camera on the user's wrist when not in use and provides only first person POV.

None of the above prior art teaches a camera support having an arm between a camera mount and a base mount that is pivotally connected to the mount, a camera support that allows the user to capture a plurality of POVs, a camera support that allows the user to switch between hand-held use and hands free use, a camera support that provides a practical POV while in a docked position, or a camera support that allows the user to capture selfies.

What is needed in the art is a camera support that allows the user to stow a camera when not used in handheld mode, quickly change between handheld and hand's free mode of operation, and provides multiple POV options. Surprisingly, the present invention provides such superior advantages.

SUMMARY OF THE INVENTION

The invention provides camera supports, methods of using the camera supports, methods of producing a video using the camera support, videos produced according to methods of the invention, and improved couplers.

A camera support of the invention comprises:
  a. an arm;
  b. a camera mount connected to the arm;
  c. a mount configured for attachment to a first supportive base ('first base mount'), wherein the arm is pivotally connected to the first base mount, e.g. about a first axis;
  d. a mount configured for attachment to a second supportive base ('second base mount'); and
  e. an arm coupler configured for releasably connecting the arm to the second base mount.

Optionally, the camera support further comprises an elbow that connects first base mount to the second end of the arm. Optionally, the camera support further comprises a first swivel joint connecting the elbow to the first base mount, optionally wherein said first swivel joint provides said first axis.

Optionally, the camera support further comprises an additional joint such as a first pivot joint connecting the first swivel joint to the first base mount, optionally wherein said additional joint provides said second axis. Optionally, the first pivot joint comprises a hinge or a flexible member.

Optionally, the camera support further comprises a ball-in-socket joint connecting the arm and the first base mount, wherein the ball-in-socket joint provides said first axis and said second axis.

Optionally, the second base mount is connected to the arm at a location intermediate of the first base mount and the camera mount. Optionally, the first base mount is connected to the arm at a first end of the arm and optionally, the camera mount is connected to the arm at a second end of the arm.

Optionally, each of the first base mount and the second base mount are configured for being attached and detached from the respective supportive bases. For example, the first and second base mounts can comprise one or more straps.

Optionally, the first base mount is movable relative to the second base mount.

Optionally, each of the first base mount and the second base mount comprises a strap, optionally wherein each of the straps is configured for attachment to a user of the camera support. Optionally, each of the straps is moveable to each other, e.g. wherein the straps are independent straps. Alternatively, each of the straps are fixed with respect to each other, e.g. wherein the straps are different portions of an elongated sleeve (e.g. forearm sleeve).

Optionally, one or both of the first supportive base and the second supportive base is a limb, optionally wherein the first supportive base and the second supportive base are portions of a limb. Optionally, the limb is a user's leg or a user's arm. Optionally, the first supportive base and the second supportive base are portions of a user's forearm (e.g. upper forearm and wrist).

Optionally, the coupler comprises a clip, a magnet, a strap, or a combination thereof.

Optionally, the camera support further comprises a swivel joint connecting the arm to the camera mount ('camera swivel joint').

Optionally, the camera mount comprises a screw (e.g. a UNC or BSW screw), a hinge (e.g. a complete hinge or a partial hinge), or a camera case.

Optionally, the camera support further comprises a leash, wherein the leash tethers the camera mount or a camera to another portion of the camera support. Optionally, the portion of the camera support is selected from the first base mount, an elbow, or the second base mount. Optionally, the arm is a tubular arm and the leash runs through the arm. Optionally, the leash is under tension.

Optionally, the arm is a non-linear arm, e.g. comprising one or more angles or curves. Optionally, the arm comprises a plurality of arm segments and at least one arm segment joint connecting the plurality of arm segments, wherein the at least one arm segment joint is a semi-secure joint or a secure joint.

Optionally, the camera support further comprises a camera mounted on the camera mount. Optionally, the camera is a video camera. Optionally, the camera has a wide angle lens. Optionally, the wide angle lens has an angle of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees. Optionally, the camera is configured to capture an image with a field of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees.

BRIEF DESCRIPTION OF THE DRAWINGS

FIG. 3A depicts a front view showing two optional positions of a camera support of the invention. FIG. 3B depicts a side view showing two optional positions of a camera support of the invention.

FIGS. 4A and 4B depict a portion of a camera support of the invention comprising a leash.

FIG. 8A through FIG. 8D additionally depict a portion of an arm secured in the arm coupler.

FIG. 9B depicts an exploded view showing the formation of ball-in-sock joints from arm segments.

DETAILED DESCRIPTION OF THE INVENTION

Figure 1A:
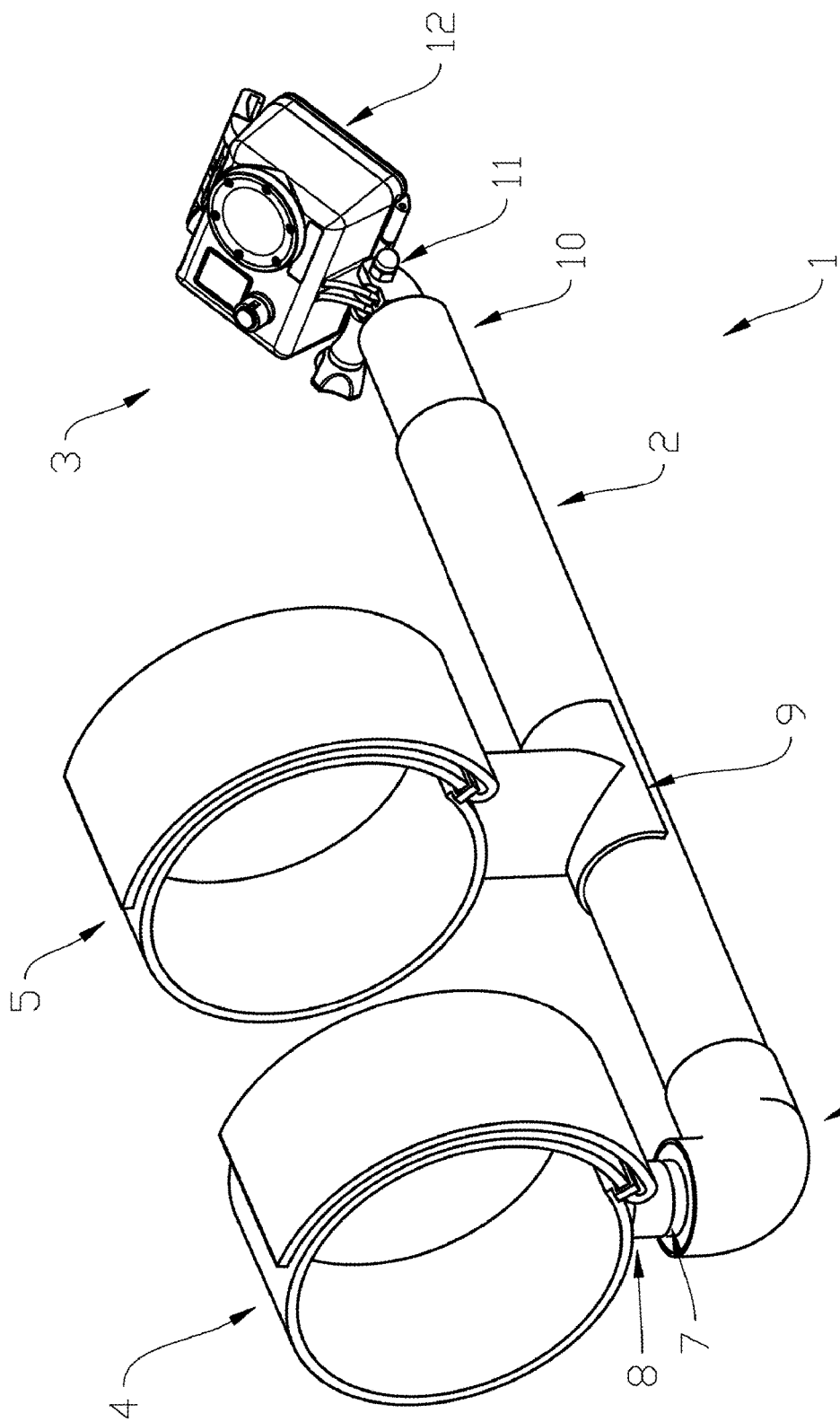
FIG. 1A and FIG. 1B depict front view of a camera support of the invention.

As used here, the following definitions and abbreviations apply.

"Examplary" (or "e.g." or "by example") means a non-limiting example.

"BSW" means British Standard Whitworth, which is a national screw thread standard. An example of a BSW is a ¼-20 BWS screw, is a screw of ¼ inch diameter having 20 threads per inch.

"Coupled" means releasably connected

"Coupler" means a connector configured for releasably connecting ('coupling') two members such as a base mount and an arm. Releasable connections can be connected and disconnected. A coupler useful in the present invention is optionally any coupler configured for quickly connecting and disconnecting two members a plurality of times (e.g. numerous times without destroying the coupler or any connected member). Optionally, a coupler useful in the present invention can be operated with one hand of a user.

"Revolve" or "revolution" refers to the orbital movement of a member around an axis or pivot joint. Optionally a revolution is a complete revolution (e.g. 360° revolution) or a partial revolution (e.g. <360° revolution or about 180° revolution.

"Substantially perpendicular" means an angle of 45° to 135° Optionally, an axis or member that is substantially perpendicular is about 70° to about 110°, about 80° to about 100°, about 85° to about 95°, or about 90°.

"UNC" means Unified National Coarse, which is a national screw thread standard. An example of a UNC is a ¼-20 UNC screw, is a screw of ¼ inch diameter having 20 threads per inch.

Joints

A camera support of the invention comprises one or more joints. According to the invention, a joint is any component that connects two members and allows movement the members relative to each other about an axis of rotation. A joint optionally allows movement about one or a plurality of axes of rotation. Optionally, the joint (e.g. pivot joint) allows movement about only one axis of rotation or about a plurality of axis of rotation, wherein the joint allows a greater range of movement about a first axis of the plurality than a second axis of the plurality.

A camera support of the invention comprises at least one pivot joint. A camera support comprising such a pivot joint is sometimes referred to herein as having members that are pivotally connected. Pivotally connected members optionally move about one or more axes of rotation. First and Second members that are pivotally connected to each other may each be directly connected to the joint or, alternatively, be connected to intermediate members that are pivotally connected to each other. Optionally, a pivot joint useful in the present invention is any joint which provides a vertex about which the angle of one member connected to the joint changes relative to another member connected to the joint ('tilting pivot joint'), e.g. joint 11 of FIG. 2 with imparts tilting movement of a camera relative to the arm about axis α, alpha. Additionally or alternatively, a pivot joint useful in the present invention is any joint around which a member revolves upon movement of the member about the joint ('swiveling pivot joint'), e.g. joint 7 of FIG. 2 which imparts revolving movement of a camera relative to the joint about axis φ, phi.

Optionally, a camera support of the invention comprises at least one swivel joint. Optionally, the swivel joint is a joint about which two members can rotate relative to each other without substantially changing the angle of the two members relative to each other. Optionally, a swivel joint between a first member (e.g. a base mount) and a second member is used to impart a pivot joint (e.g. swivel pivot joint) between a third member (e.g. an arm) and the first member, e.g. by connecting the third member to the second member via an elbow such that the angle of the third member revolves around the joint upon movement of the third member. For example, as depicted in FIG. 1B, swivel 7 is positioned between base mount 4 and elbow 6, and imports pivotal movement to arm 2 and revolution of a camera about the base mount and joint.

Optionally, a camera support of the invention comprises a plurality of joints. For example, a camera support can comprise one or more joints that connect an arm to a first base mount ('arm joints') and one or more joints that connect a camera or a camera mount to an arm ('camera joints'). Arm joints can, for example, provide broad movement to a mounted camera such as revolution of the camera about the first base mount (e.g. about axis φ, phi, depicted in FIG. 2) while camera joints can for example provide more discrete positions or angles to a camera such as swiveling of the camera or pivoting of the camera (e.g. about axis α, alpha, depicted in FIG. 2). Accordingly, a camera, when mounted on the opposing side of an arm relative to an arm joint, optionally moves about both the arm joint (e.g. arm pivot provided by swivel 7, depicted in FIG. 1B) and one or more camera joints (e.g. a camera swivel 10 and/or a camera pivot as depicted in FIG. 1B).

Joints useful in the present invention include free joints, secure joints (also referred to herein as 'secured joints' or 'securable joints'), and semi-secure joints (also referred to herein as 'semi-secured joints' or 'semi-securable joints'), joints. A free joint is a joint that allows substantially non-resistive movement (e.g. free movement) of the connected members, for example, such that a user can easily move the joint or such that the weight of one of the connected members is sufficient to move the member about the joint. A secure joint is a joint comprising a locking mechanism (e.g. a pin, set screw, a locking nut, or a clamp) that can be used to secure the joint at a desired angle. A semi-secure joint is a joint that provides substantial resistance to movement of the connected members about the joint, for example, such that a deliberate (e.g. difficult or strenuous) force of manipulation by the user is required to move the members about the joint and/or the weight of the connected members alone is not enough to cause movement of the members about the joint. Optionally, the camera support comprises an arm joint that is a free joint and optionally further comprises one or more camera joints (e.g. a swivel and/or a pivot) that are secure joints or semi-secure joints. Optionally, the camera support further comprises one or more arm segment joints that are secure joints or semi-secure joints.

Optionally, the camera support comprises one or more arm joints that are free joints.

Optionally, the camera support comprises one or more camera joints that are semisecured or securable joints.

Optionally, the camera support comprises one or more arm segment joints that are semisecured or securable joints.

Optionally, a camera support of the invention comprises one or more joints that impart any range of movement taught herein (e.g. movement of an arm, a camera, or a camera mount about an axis).

Joints of the present invention can be any type of joint. For example, the joint can impart movement about a plurality of axes (e.g. ball-in-socket joint or a joint made from a plurality of single-axis hinges) or a single axis (e.g. a hinge configured to impart movement about a single axis such as a single-axis swivel or a single axis-pivot).

Optionally, a joint useful in the present invention is configured to move two members relative to each other about an axis that is fixed relative to the two members (e.g. a joint constructed from rigid a material).

Optionally, a joint useful in the present invention imparts less than 360° range of movement about one or more axes. For example, a joint (e.g. a pivot joint, a swivel joint, a hinge, or a ball-in-socket joint) optionally comprises a stopping mechanism for limiting range of movement about an axis. For example, any arm joint or camera joint optionally imparts less than 360° range of movement about one or more axes.

Optionally, a joint useful in the present invention imparts 360° movement about an axis (e.g. a pivot joint, a swivel joint, a hinge, or a ball-in-socket joint). For example, any arm joint or camera joint optionally imparts 360° movement.

Optionally, the camera support comprises an arm joint that imparts revolving movement of a camera, when connected, about the first base mount (e.g. joint 7 of FIG. 7 or joint 65 of FIG. 12A), optionally wherein the arm joint is a free joint, and the camera support further comprises a first camera joint (e.g. swivel joint) that imparts rotation of the camera about the arm (e.g. joint 10 of FIG. 2 or joint 91 of FIG. 12B), wherein the first camera joint is a secure joint or a semi-secure joint. Optionally, the camera support further comprise a second camera joint (e.g. tilting pivot joint) that imparts tilting of the camera relative to the arm (e.g. joint 11 of FIG. 2 or FIG. 14A or partial joint 81 of FIG. 13C), wherein the second camera joint is a secure joint or a semi-secure joint. Optionally, the arm comprises a plurality of arm segments and one or more arm segment joints that connect arm segments are secure joints or semi-secure joints.

A joint useful in the present invention can be made of any material. Useful materials include, e.g. rigid materials, flexible materials, a metal, a ceramic, a plastic, a wood, or any natural or synthetic materials.

Arm

A camera support of the present invention comprises an arm. The arm can be configured in any manner such that it can be connected to a camera mount, pivotally connected to a first base mount, and releasably connected ('coupled') to a second base mount.

Optionally, the arm is configured in any manner that provides an extension between the first base mount and a camera when the camera is mounted to the camera mount. For example, the arm can provide an extension that allows the camera to take a sweeping path or revolution about the first base mount, e.g. rather than merely tilting relative to the base mount. Optionally, the arm has a length that allows a user to grab the arm with his hand when the first base mount is mounted to the user's wrist.

Any arm is useful in the present invention. The arm can comprise any material, shape, or dimensions.

Optionally, the arm is an elongated arm, e.g. an arm having a length that is greater than its width (e.g. where the length is the dimension that coincides with a segment that runs through the center of the arm and intersects both the camera mount and the axis of an arm joint about which the camera mount revolves).

Optionally, the arm is connected to an arm joint via an elbow.

Optionally, the arm is extendable, i.e. has an extendable length. Optionally, the extendable arm is a telescopic arm. For example, a telescopic arm optionally comprises a member that inserts into one or more tubes of progressively greater diameters nested within each other). Optionally, the telescopic arm comprises a fixing device that secures two tubes together to provide a stable length (e.g. clamp that secures two tubes together or a spring loaded button that extends from an inner tube through a hole in an outer tube). Additionally or alternatively, the telescopic arm can be a threaded telescopic arm, e.g. wherein an inner tube comprises male threads on its outside that screw into female threads on the inside of an outer tube.

Axes of Movement

According to the present invention, the camera support is configured such that the arm is pivotally connected to the first base mount. Accordingly, an arm of the invention is configured to move about at least a first axis. Optionally, the arm is configured to move (i.e. pivot) about a second axis. Optionally, the arm is configured to move about more than two axes. Optionally, one or more axes of movement of the arm can be provided by one or more arm joints.

Figure 2:
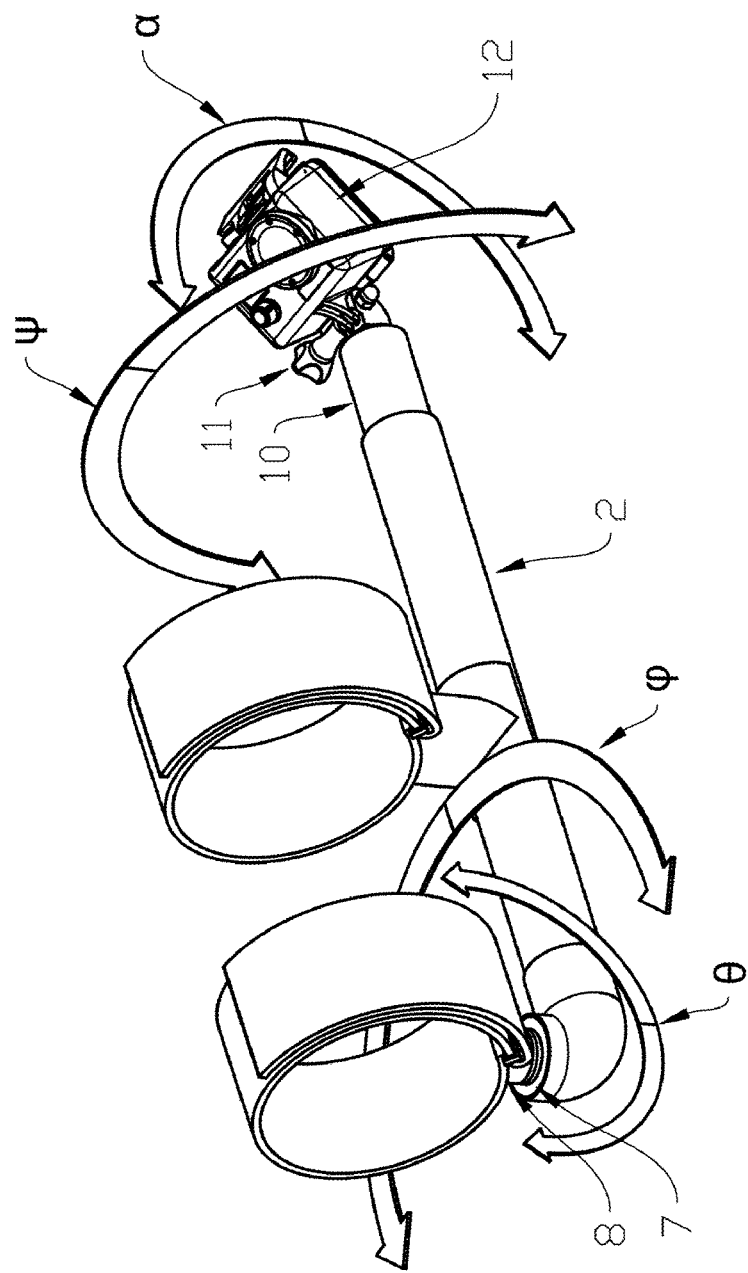
FIG. 2 depicts example axes about which members of a camera support of the invention can move.

Optionally, the first axis is substantially perpendicular (e.g. perpendicular) to the surface of the first supportive base to which the first base mount is configured for mounting (e.g. axis φ phi shown in FIG. 2 which is perpendicular to the surface to which the first base mount is configured for mounting). Alternatively, the first axis is substantially parallel to (or substantially parallel with a tangential plane of) the surface of first supportive base (e.g. user's limb) to which the first base mount is configured for attachment (e.g. axis θ theta shown in FIG. 2). Accordingly, in the preceding two embodiments, the camera support is optionally configured such that the arm pivots on a plane that is a) substantially parallel to (or substantially parallel with a tangential plane of) the surface of first supportive base, or b) substantially perpendicular to the surface of the first supportive base to which the first base mount is configured for mounting, or both a) and b).

Optionally, the first axis is substantially perpendicular to the surface of the first supportive base to which the first base mount is configured for mounting. For example, the first base mount is optionally a strap that conforms to the surface of the first supportive base (e.g. a user's limb) and the first axis is substantially perpendicular to the portion of the strap to which the respective arm joint is connected.

Optionally, the first axis is substantially perpendicular to the portion of a first base mount (e.g. strap) to which the respective arm joint is connected.

Optionally, the arm moves about a second axis. Optionally, the second axis is substantially perpendicular (e.g. perpendicular) to the first axis. Optionally, the second axis is parallel to (or parallel with a tangent of) the surface of first supportive base (e.g. user's limb) for which the first base mount is configured for mounting and/or the second axis is parallel to (or parallel with a tangent of) of the portion of the first base mount (e.g. strap) to which the respective arm joint is connected. Optionally, the range of motion of the arm about the first axis is substantially greater than the range of motion of the arm about the second axis.

Optionally, the arm is pivotally connected to the first base mount about a first axis and a second axis, wherein the second axis is different than (e.g. non-parallel to) the first axis. Optionally the first axis and the second axis are substantially perpendicular (e.g. perpendicular).

Optionally, the camera support comprises an arm joint configured to provide the first axis such that at least one of the distance and the angle of the arm relative to either first supportive base or the first base mount is substantially constant upon pivoting of the arm about the first axis (e.g. axis φ phi shown in FIG. 2), e.g. the arm moves about a plane that is parallel to the surface of the first supportive base or a tangential plane thereof. This is in contrast to a tilting joint which changes the change between to directly connected members (e.g. axis θ theta shown in FIG. 2 which imparts tilting of the arm relative to the supportive base such as a user's forearm). Optionally, the camera support comprises an arm joint configured to provide a second axis wherein at least one of the distance and the angle of the arm relative to the first supportive base changes substantially upon pivoting of the arm about the second axis (e.g. axis θ theta shown in FIG. 2), e.g. the arm moves about a plane that is substantially perpendicular (e.g. perpendicular) to the surface of the first supportive base. Optionally, the range of motion of the arm about the first axis is substantially greater than the range of motion of the arm about the second axis.

Optionally, the arm is configured to move about a first axis and a second axis, wherein the range of motion of the arm about the first axis is substantially greater than the range of motion of the arm about the second axis, e.g. wherein the first axis is perpendicular to the second axis.

Arm Shape

An arm useful in the present invention can be any shape.

Optionally, the arm is substantially cylindrical or has a circular cross section.

Figure 1B:
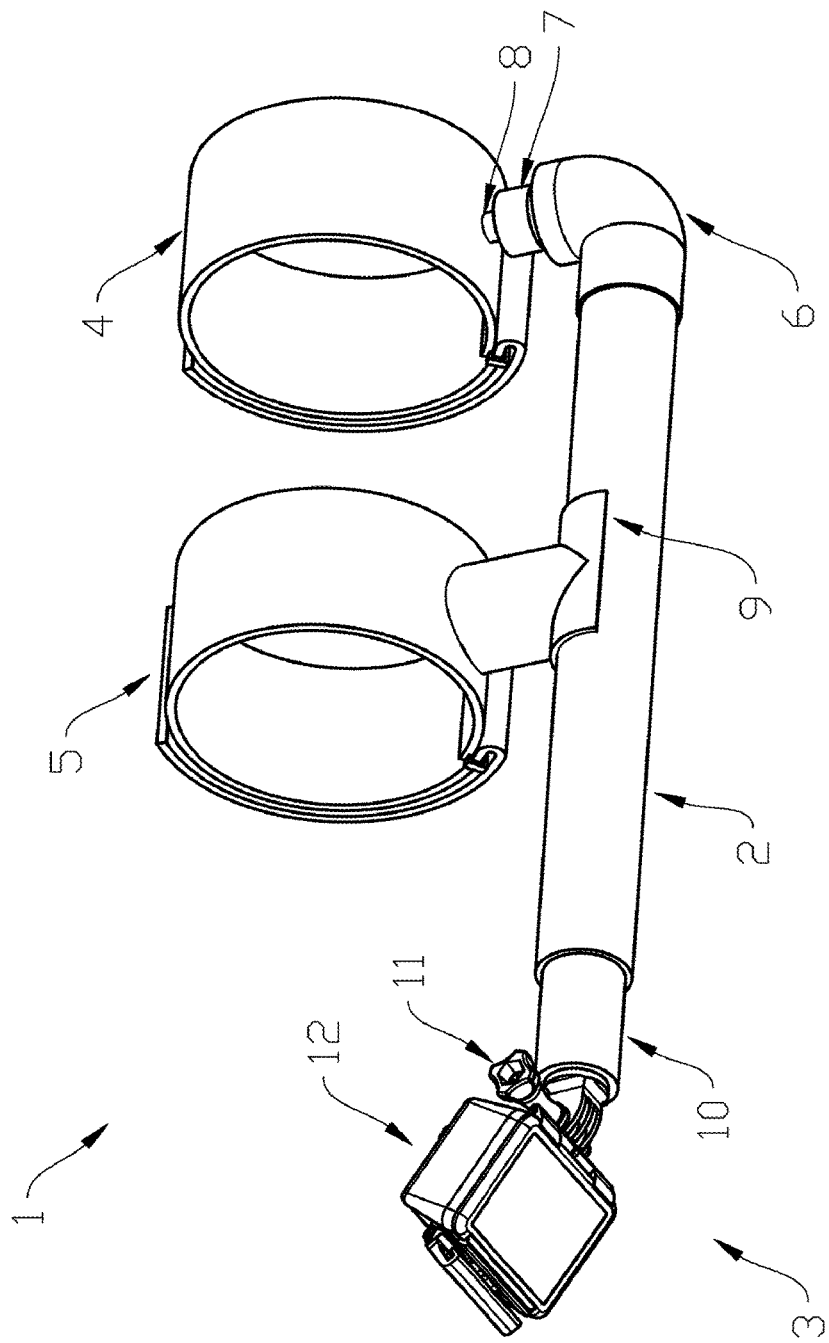
Figure 9A:
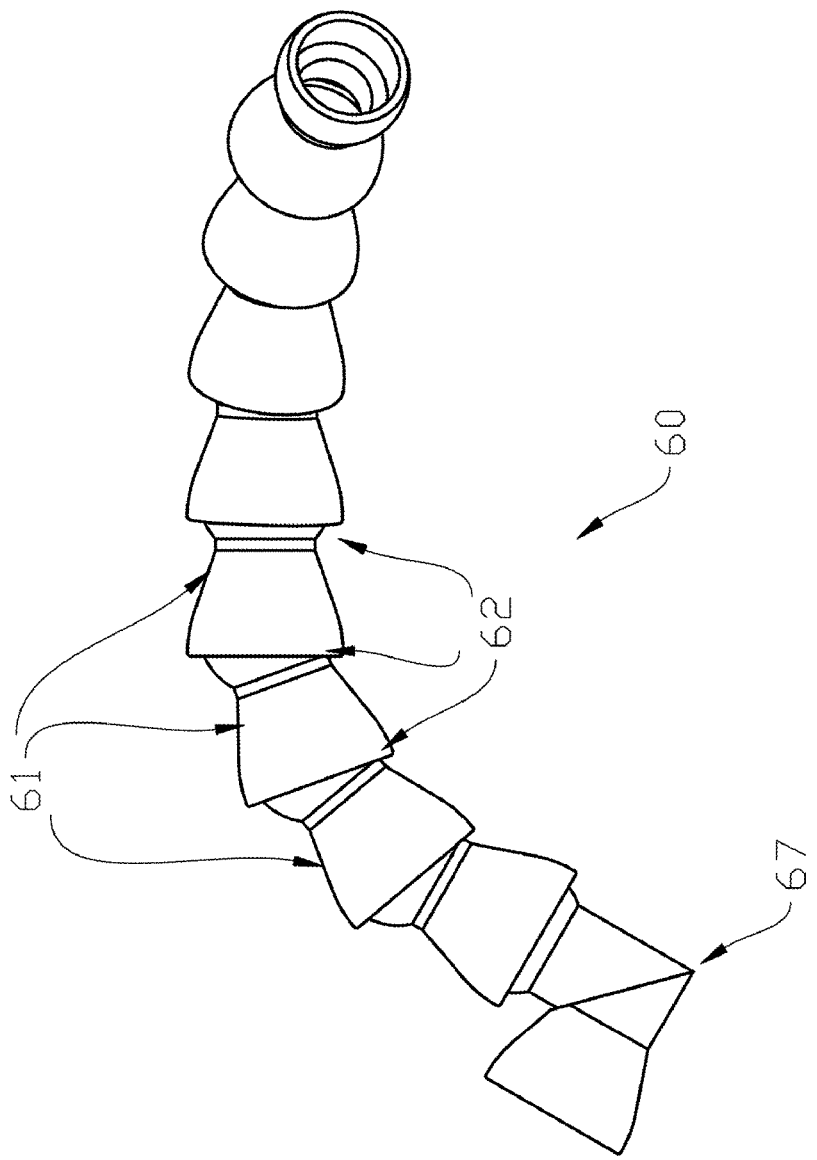
FIG. 9A depicts a segmented arm comprising arm segments joints useful in a camera support of the invention.

Optionally, the arm has a substantially uniform width (e.g. arm 2 of FIG. 1A or arm 60 of FIG. 9A).

Optionally, the arm has a length such that the distance between the camera mount and first base mount is about 10 cm to about 90 cm. For example, said distance can be any of about 15 cm to about 60 cm, about 15 cm to about 50 cm, about 15 cm to about 40 cm, about 20 cm to about 60 cm, and about 25 cm to about 50 cm.

Optionally, the arm is a tube or comprises a tube along a portion of its length. Such an tubular arm is useful for containing other components. For example, a tube can be provided such that the camera support can comprise a leash that runs through the tube.

Optionally, the arm is a mono-pod, i.e. the arm is a single arm or the arm does not comprise multiple non-parallel arms that run alongside each other connecting the camera mount with the first base mount or with a plurality of base mounts (e.g. as in a tri-pod).

An arm of the invention can be linear or non-linear. Examples of non-linear arms include arms that have one or more curves or angles. Non-linear arms can be provided, e.g. using joints, preformed bends (e.g. in a rigid arm), or by an arm constructed from a malleable material (e.g. a soft metal or other malleable material that can be shaped as desired by the user).

Optionally, the arm is substantially straight along its entire length or comprises a portion that is substantially straight. Alternatively, the arm is optionally curved along its entire length or comprises a portion that is substantially curved. Alternatively, the arm comprises a portion that is curved and a portion that is straight.

Figure 12A:
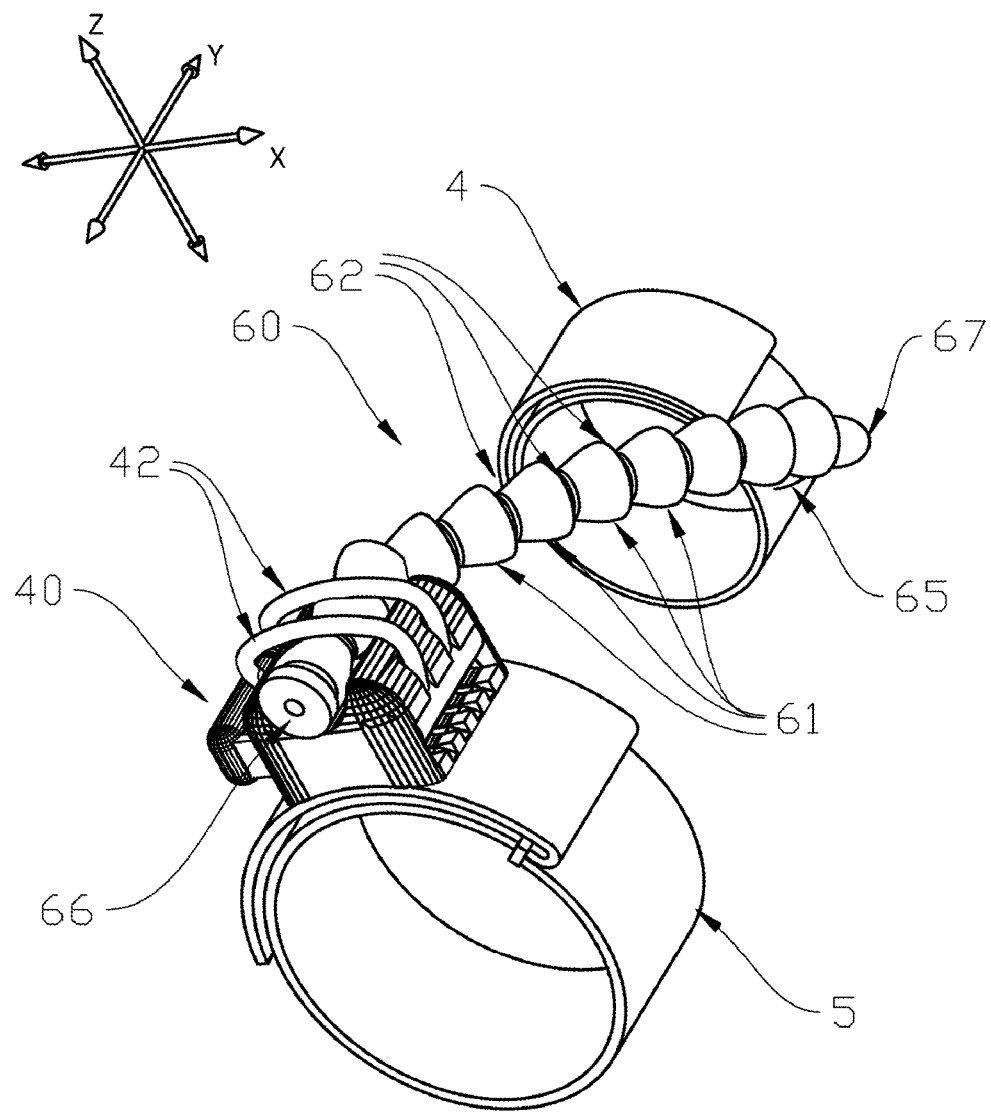
FIG. 12A-FIG. 12C depict a camera support of the invention.
Figure 14A:
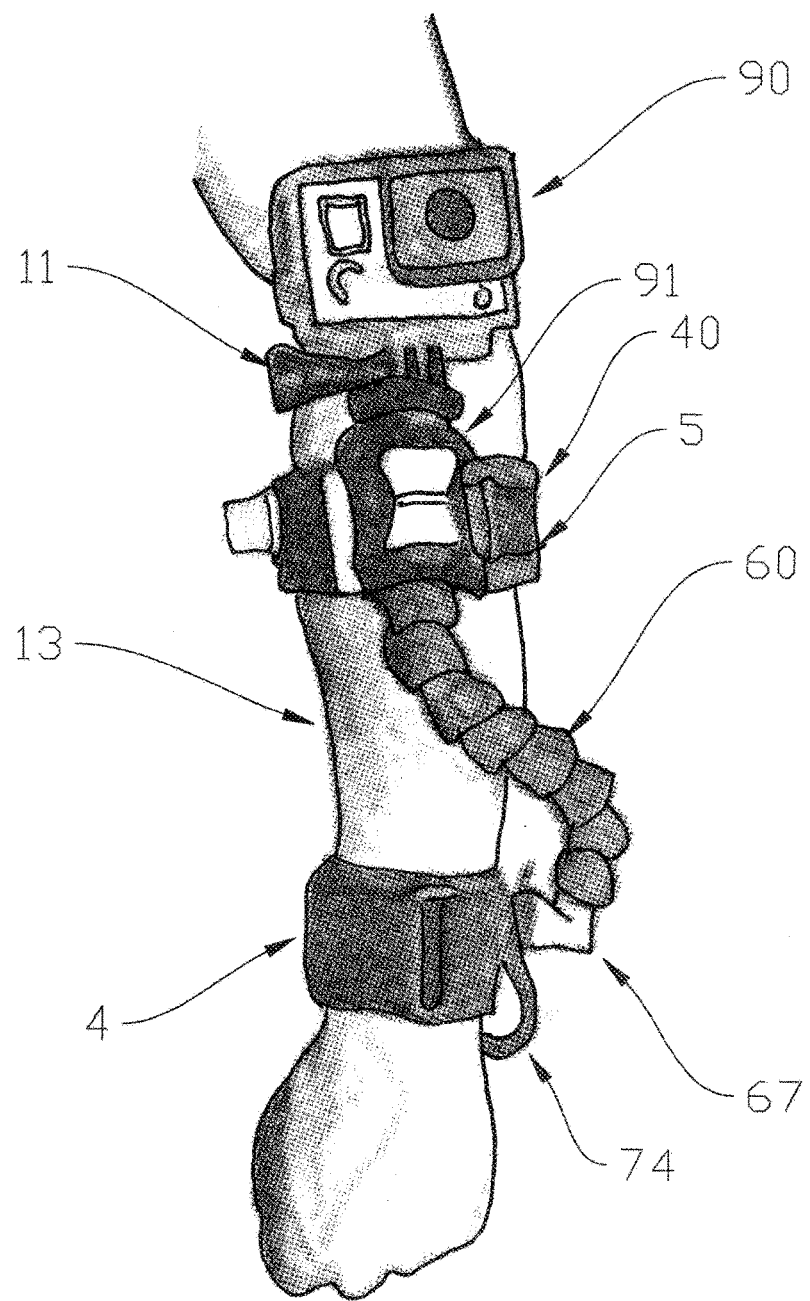
FIG. 14A-FIG. 14D depict a camera support of the invention mounted with a camera and mounted to a user's forearm.

Optionally, the arm has an angle (e.g. a hard angle or a curve) at a location intermediate of an arm joint and a camera mount. Optionally, the angle is at a location intermediate of an arm coupler of a second base mount and a camera mount or intermediate of a first base mount and the arm coupler. Optionally, the angle connects two members (i.e. portions of the arm or "arm segments"), wherein the members are two straight portions of the arm, two curved portions of the arm, or a straight portion of the arm and a curved portion of the arm. Optionally, the arm comprises a plurality of angles, optionally wherein each angle connects two members selected from straight portions of the arm and curved portions of the arm. Optionally, the arm comprise an 60°-120°, 90°-170°, 90°-160°, 90°-150°, 90°-140°, 90°-130°, 90-120°, or 110°-160°. An arm comprising one or more angles provides surprising advantages. For example, it allows the arm to comfortably span from a first base mount into the users hand when the first base is mounted to a user's wrist. It also can allow the arm to span from the first base mount to the second base mount when, e.g. the first and second base mounts to be connected to the arm about different planes or surfaces (e.g. as depicted in FIG. 12A and FIG. 14A).

Optionally, the arm has at least one angle, wherein the at least one angle is adjustable, e.g. an adjustable angle provided by a secure joint or a semisecure joint. An arm comprising one or more adjustable angles allows the user to shape the arm as desired. Such a feature provides surprising advantages. For example, it allows the user to impart a tailored ergonomic shape for grasping by the user. As another example, it allows the user to choose positions the first and second base mounts (e.g. which may be connected to the arm about the same or different planes or surfaces), and impart a tailored shape to the arm such that it can span from the first base mount to a the second base mount.

Optionally, the arm comprises at least two arm segments and an adjustable angle between the at least two arm segments. An adjustable angle can be provided, for example, by a secure joint or a semi-secure joint. A joint that provides an adjustable angle between two arm segments is also referred to herein as an "arm segment joint". As one example, the arm can comprises a plurality of arm segments connected by a semi-secure joint that provides substantial resistance to movement of the connected arm segments relative to each other about the joint, for example, such that the weight of a camera mounted on the arm is insufficient to cause movement of the arm segments relative to each other and a deliberate force of manipulation by the user is required to move the arm segments about the joint.

Optionally the arm comprises two arm segments connected by a ball in socket joint, wherein the ball-in-socket joint is a semi-secure joint. For example, the ball-in-socket joint can be configured as a semi-secure joint by providing substantial friction between the ball and the socket (e.g. aided by a tight fit and/or frictional surfaces). Optionally, the arm comprises a number of arm segments semi-securely joint to each other, wherein the number of arm segments is selected from at least three, at least four, at least five, at least six or at least seven arm joints.

Optionally, the arm is configured for holding by a user's hand, i.e. the arm has at least a portion configured for grasping by a user's hand ('hand grip') For example, the hand grip optionally has a width of any of: about 0.5 cm to about 15 cm, about 1 cm to about 7.5 cm, about 1 cm to about 6 cm, about 1.3 cm to about 5.5 cm, about 1.9 cm to about 4 cm, or about 1.5 cm to about 3.5 cm. Optionally, the hand grip has a cross-section that is substantially circular, elliptical, or shaped for ergonomically fitting in a user's hand. Optionally, the hand grip comprises a frictional material (e.g. rubber), a malleable material (e.g. gel or foam such foam rubber or polyurethane foam).

Modular Camera Support

Optionally, a camera support comprises an arm that is releasably connected (e.g. by a coupler) to the first base mount and/or the camera mount. Such a camera support is referred to herein as a modular camera support. For example, a modular camera support can be used to impart the capacity for having replaceable arms, e.g. where a first arm is replaced with a second arm.

Figure 11:
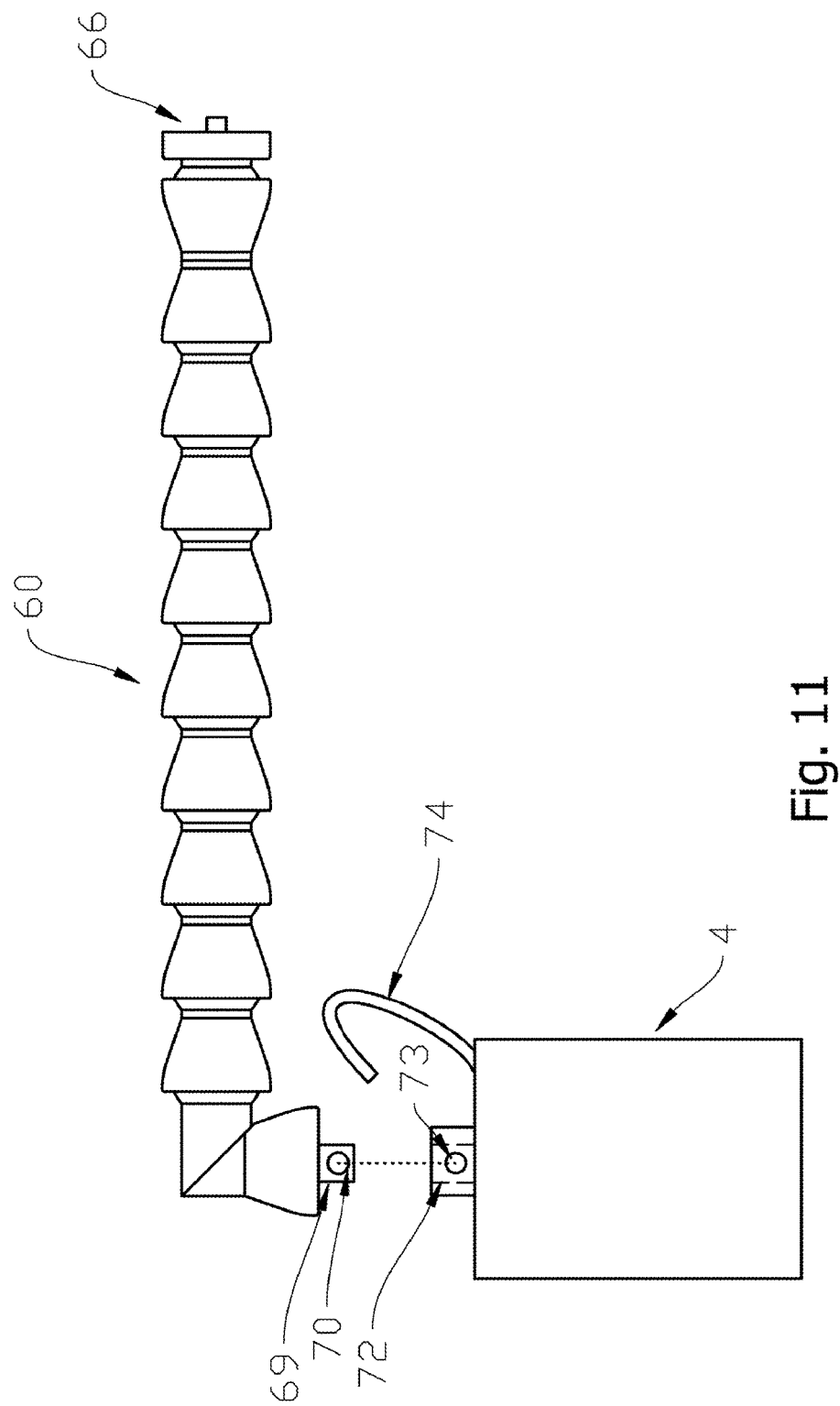
FIG. 11 depicts a portion of a camera support comprising quick connector for connecting a first base mount to an arm.

Optionally, the camera support comprises a coupler between the arm and the first base mount, e.g. a quick connector shown in FIG. 11.

Figure 13B:
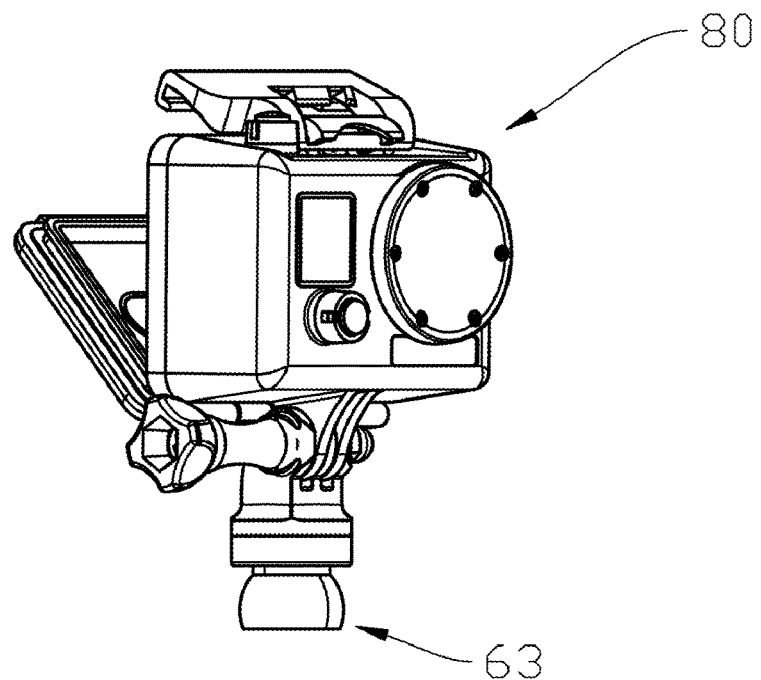
FIG. 13A-FIG. 13D depict camera mounts useful in the present invention.
Figure 13A:
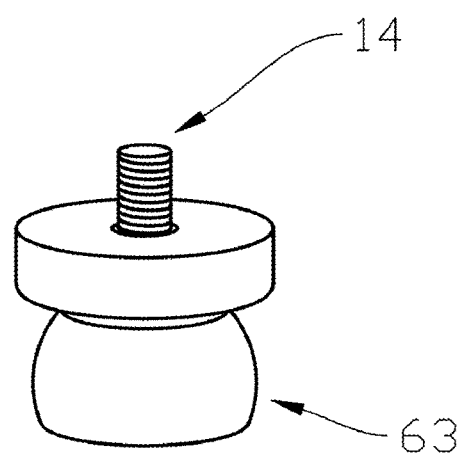
Figure 13D:
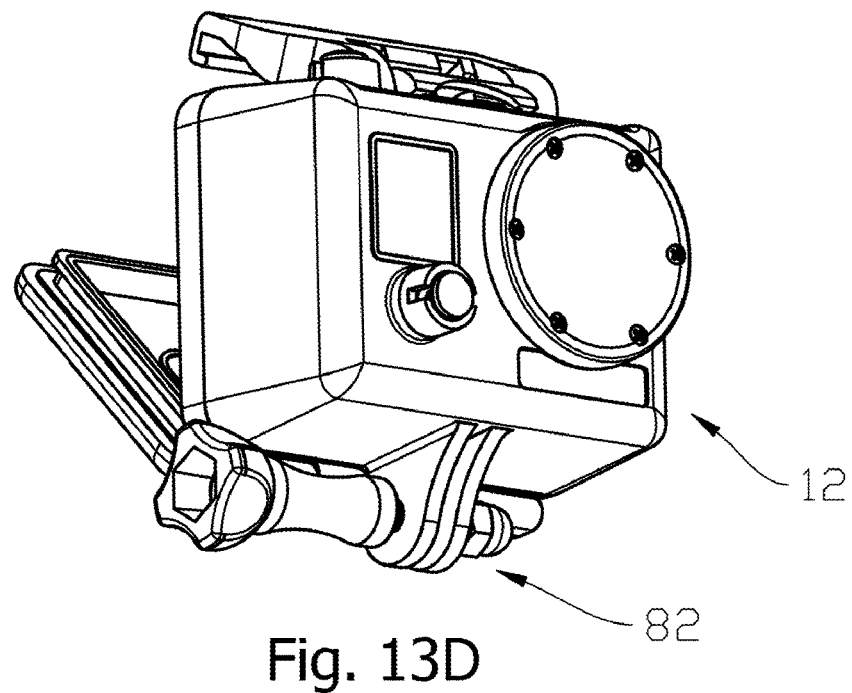
Figure 13C:
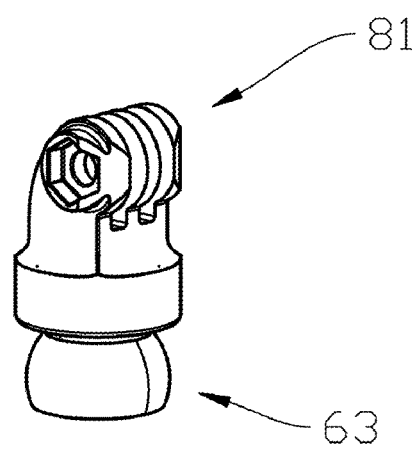

Optionally, the camera support comprises a coupler between the arm and the camera mount, e.g. such that different camera mounts can be used with the camera support. Optionally, the invention provides a kit comprising a camera support and a plurality of interchangeable camera mounts. For example, the kit can comprise two or more interchangeable camera mounts seleted from a screw, a partial hinge, and a camera case, e.g. as depicted in FIGS. 13A-13C. For example, any of the camera mounts depicted in FIGS. 13A-13C can be connected to ball 63 that can be "popped" in to the socket of an arm, e.g. an arm shown in FIG. 12A and described in Example 8.

Optionally, the invention provides a kit comprising modular camera support, wherein the kit comprises a plurality of arms, wherein each arm of the plurality can be independently connected to the first base mount and/or the camera mount. Optionally, the arms have different length or shape.

Materials

An arm of the invention can be constructed from any material. In one embodiment, the arm is made from any rigid material.

Optionally, the arm is made from a plastic, a metal, a ceramic, or any natural or synthetic material.

Examples of useful plastics include PVC, polyurethane, polyethylene, and polypropylene.

Examples of useful metals include aluminum and steel.

Optionally the arm is rigid and comprises carbon fiber.

Elbow

Optionally, a camera support comprises an elbow that connects the arm to the first base mount. For example, the elbow can be connected at a first end to the first base mount and at a second end to the arm.

An elbow can be provided, e.g. to impart revolving movement of camera about the first base mount (e.g. wherein a swivel is provided between the base mount and the elbow) and/or to provide separation between the arm and the first base mount or supportive base. Surprisingly, in embodiments that provide the first base mount as an arm strap, an elbow optionally provides spacing such that the arm can be positioned comfortably in the users hand while pivotally connected to the first base mount such that the camera can revolve or sweep about the first base mount into the user's hand.

Optionally, the elbow is connected to the first base mount via a swivel joint (e.g. swivel joint 7 of FIG. 2 or swivel joint 65 of FIG. 12A), e.g. where the first end of the elbow rotates about the swivel joint axis and the second end of the elbow and the arm revolve around the swivel joint axis (e.g. wherein the axis of the swivel joint is perpendicular to the surface of the supportive base to which the base mount is configured for attachment). Optionally, the swivel joint comprises a bearing (e.g. swivel joint 7 of FIG. 4A or swivel joint 65 of FIG. 12A) such as a bearing as is used in a surf leash cuff connection (as shown in FIG. 4A).

Optionally, the elbow is additionally connected to the first base mount via a pivot joint, e.g. where the first end of the elbow revolves about the pivot joint axis (e.g. wherein the axis of the pivot joint is parallel to the surface of the supportive base or a tangential plane thereof to which the base mount is configured for attachment). Optionally, the range of movement about the pivot joint is less than the range of movement about the swivel joint. Optionally the pivot joint comprises a hinge, a ball-in socket joint, or a flexible member (e.g. a semi-rigid member). An example of a flexible member is a flexible strap of a base mount to which an arm is connected.

Optionally, the elbow is connected to the first base mount via a ball-in-socket joint. Optionally, the ball in socket joint provides movement of the arm along a plurality of axes, e.g. provides movement of the arm both perpendicular and parallel to the surface of the supportive base to which the first base mount is configured for attachment. Optionally, the range of perpendicular movement is less than the range of parallel movement.

The elbow can have any angle, e.g. any angle less than 180°. Optionally, the elbow has an angle of about 90°. Optionally, the elbow has an angle of about 90° to an angle of less than 180°. Optionally, the elbow has an angle of less than or equal to about 150° and greater than or equal to about 90°. Optionally, the elbow has an angle of less than or equal to about 120° and greater than or equal to about 90°. Optionally, the elbow has an angle of less than or equal to about 110° and greater than or equal to about 90°. Optionally, the elbow has an angle of less than or equal to about 120° and greater than or equal to about 60°.

Camera Mount

A camera support of the present invention comprises a camera mount configured to connect a camera to the arm. Any camera mounting mechanism is useful in the present invention. For example, the camera mount can be configured for permanently or transiently attaching a camera to the arm.

Optionally, the camera mount is connected to an end of the arm. For example, the camera mount can be connected to a first end of the arm, wherein a second end of the arm is connected to the first base mount.

Optionally, the camera support comprises one or more camera joints configured to impart movement relative to the arm of the camera mount or a camera when mounted.

Optionally, the camera mount is selected from a screw, a camera case, and a joint (e.g. a partial joint such as a partial tilting pivot joint).

Optionally, the camera mount is configured for attachment directly to a camera, e.g. a screw 14 such as a UNC screw depicted in FIG. 13A or a camera case 80, e.g. as depicted in FIG. 13B. Alternatively, the camera mount can be configured for attachment to a camera case, e.g. portion 81 of a hinge joint as depicted in FIG. 13C. For example, certain cameras such as a GoPro® come with a case 12 that has a partial hinge 82, as depicted in FIG. 13D. The partial hinge of the camera case 82 depicted in FIG. 13D can be mounted on the partial hinge 81 of the camera mount depicted in FIG. 13C. Optionally, the camera mount is connected or can be connected to the arm to form a swivel (e.g. by the partial swivel joint depicted by the ball 63 of FIGS. 13A-13C).

Mounting Mechanisms

Any camera mounting mechanism is useful in the present invention.

Optionally, the camera mount is a camera coupler configured for releasably connecting a camera to the arm. Optionally, the camera coupler is selected from a screw, a threaded hole, a camera case, a clamp, a magnet, a partial joint, and a tether.

Optionally, the camera mount comprises a screw. Optionally, the screw is selected from a ¼-20 UNC screw, a ⅜-16 UNC screw, a ¼-20 BSW screw, and a ⅜-16 BSW screw. Each of these screws is known in the camera arts as a standard camera mounting screw. Optionally, the screw is any standard camera mounting screw (e.g. where a camera or second camera mount comprise a threaded hole configured to accept the screw).

Optionally, the camera mount comprises a camera case. Optionally, the camera case is rigid. Optionally, the camera case is transparent. Optionally, the camera case is waterproof.

Optionally, the camera mount comprises a clamp. For example, the clamp is optionally a spring clamp, a screw clamp, a hose clamp, a strap clamp, or a latch clamp.

Camera Joints

According to the present invention, a camera support optionally comprises one or more camera joints. The one or more camera joints can be configured in any manner that imparts movement relative to the arm of the camera mount or a camera when mounted. For example, the one or more camera joints can connect the camera mount to the arm or can be part of the camera mount itself.

Optionally, the one or more camera joints comprise a pivot joint (e.g. a tilting pivot joint such as joint 11 shown in FIG. 2 or a partial tilting pivot joint such as joint 81 of FIG. 13C), a swivel joint (e.g. swivel joint 10 shown in FIG. 2 or swivel joint 91 of FIG. 12B which can be provided by a ball in in socket), or both a pivot joint, a swivel joint. The camera pivot joint can be, e.g. any joint that imparts movement to a camera, when mounted, such that the angle of the line of sight of the camera (e.g. a line that passes through the center of the camera's field of view) is changed relative to the arm, e.g. by tiling the line of sight. The camera swivel joint can be, e.g. any joint that imparts movement to a camera such that the line of sight sweeps about an axis without changing the angle of the line of sight relative to the arm.

Optionally, the one or more camera joints are secure joints or semisecure joints.

Materials

A camera mount of the invention can be constructed from any materials. Optionally, the arm is made from any rigid material.

Optionally, the camera mount is made from a plastic, a metal, a natural material, or a synthetic material.

Examples of useful plastics include polycarbonate, PVC, polypropylene, and polyethylene.

Examples of useful metals include steel and aluminum.

Base Mounts

According to the invention, a camera support comprises a plurality of base mounts. Each base mount is configured for being attached to a supportive base. Optionally, the camera support comprises a first base mount and a second base mount, wherein each of the first base mount and the second base mount are configured for being attached and detached from respective supportive bases.

The supportive bases to which the respective base mounts are configured for attachment can be any supportive bases. Optionally, the respective supportive bases are portions of the same structure (e.g. a limb such as a user's leg or a user's an arm). Alternatively, the respective supportive bases are independent structures.

Optionally, the first base mount is movable relative to the second base mount (e.g. when not attached to respective bases). For example, the first base mount and the second base mount can be independent straps. Alternatively, the first base mount and the second base mount are optionally in a fixed position relative to each other. For example, the first base mount and the second base mount can each be part of a single strap having the first base mount and the second base mount in fixed positions (e.g. an elongated sleeve such as a sleeve configured for placement on a user's forearm).

Optionally, one or more of the first base mount and the second base mount comprises a strap. Optionally, a strap is configured for attachment to a user of the camera support (e.g. a forearm of the user). Optionally, the first base mount comprises a first satrap and the second base mount comprises a second strap, wherein the first strap comprises a first diameter and the second strap comprises a second diameter, and the first diameter is substantially less than the second diameter. Such a configuration is useful for connecting the straps to supportive bases of different diameters, e.g. first strap to a wrist and a second strap to the upper forearm of a user.

Mounting Mechanisms

The base mounts can be any comprise any mounting mechanism configured for attachment (e.g. releasable attachment) to the respective supportive base. Optionally, the mounting mechanism is configured for fixing the positions of the base mounts or connected members (e.g. a pivot joint connected to the first base mount or an arm coupler connected to the second base mount).

Optionally, one or more of the base mounts comprise a mounting mechanism selected from: a strap, a clamp, an adhesive, a magnet, a screw, a button, a zipper, a suction cup, a clip (e.g. having a male or female component that interacts with a female or male component, respectively), or a fastener (e.g. a hook and loop fastener such as Velcro®).

Figure 6A:
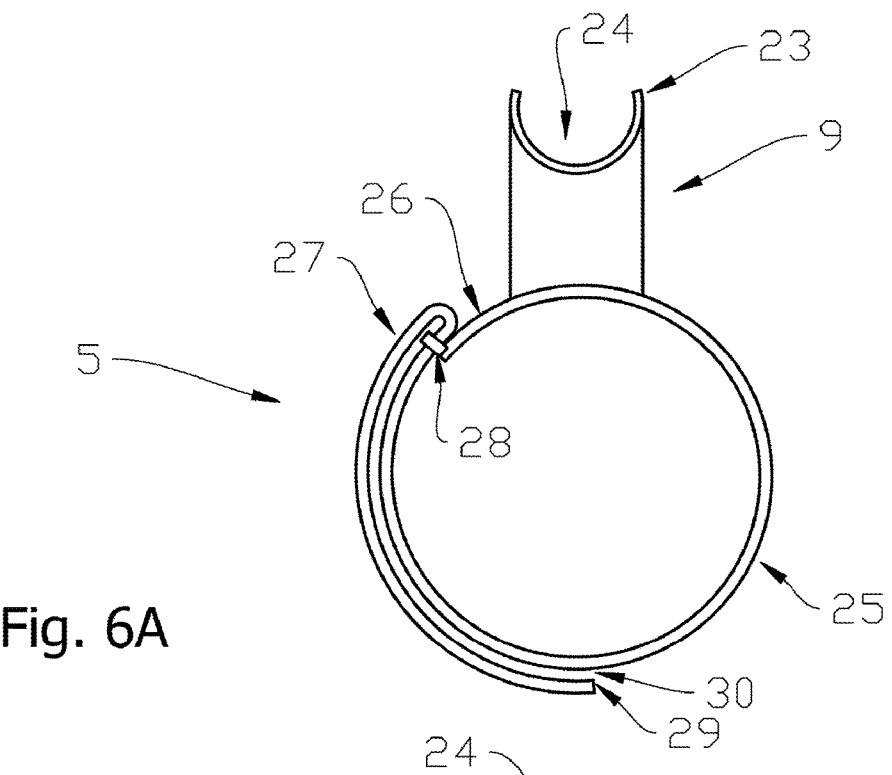
FIG. 6A depicts a top view of a second base mount and arm coupler useful in a camera support of the invention.

Optionally, one or more of the base mounts comprise a strap. Optionally, the strap comprises tightening mechanism. Optionally, the tightening mechanism is a mechanism that can be used to tighten the strap with one hand (e.g. a slip knot mechanism, e.g. as depicted in FIG. 6A which shows part 28 used it impart the slip knot mechanism) or automatically tightens (e.g. an elastic material)

Optionally, the strap comprises a closed strap (e.g. a sleeve) or an open strap (e.g. a strap formed by attaching the ends of a member together by a fastening mechanism).

Optionally, the strap is an open strap having fastening mechanism configured to secure the strap to the respective supportive base, e.g. a fastening mechanism configured to fasten the ends of an open strap together. Optionally, the fastening mechanism is selected from: a buckle, a hook and loop fastening mechanism (e.g. Velcro®), a button, a zipper, adhesive, or any releasable connector (e.g. a connector having interacting members that bring ends of the strap together). Examples of useful buckle types include, e.g. a side release buckle, a center release buckle, a lobster hook, a slide buckle, a belt buckle (e.g. having a frame, bar, and prong, e.g. wherein the other end of the strap comprises one or more holes for acceptance of the bar).

Optionally, a slip-knot tightening mechanism and a fastening mechanism configured to secure the strap to the respective supportive base. The slip-knot device is optionally any device comprising a ring positioned on one end of a strap (e.g. an open strap), wherein the other end of the open strap can be inserted into the ring, and pulled back towards the middle of the strap, e.g. folded back and pulled, to tighten the strap. The term "slip knot" encompasses both an actual knot (e.g. as tied in a rope) and any strap that tightens in a slip-knot fashion (e.g. by looping an end of the strap through a ring and pulling to tighten the strap). Optionally, the fastening mechanism is a hook and loop fastening mechanism or a buckle.

Optionally, the mounting mechanism is any mounting mechanism configured for releasable attachment (i.e. can be detached and reattached a plurality of times) to a supportive base.

Optionally, the first and second base mounts collectively or independently comprise strap, e.g. having a structures are described by U.S. Pat. No. 8,016,492, which is hereby incorporated by reference.

First Base Mount

A camera support of the invention comprises a first base mount pivotally connected to the arm. Accordingly, the first base mount can be pivotally connected to the arm by one or more joints ('arm joints').

Optionally, the first base mount is strap, e.g. a wrist strap. Optionally,

Optional configuration of said pivotal connections and arm joints are taught herein. For example, the first base mount can be pivotally connected to the arm about an axis that is substantially perpendicular to the surface of the support base (or a tangential plane thereof), e.g. wherein an elbow connects the first base moutn to the arm and the camera support comprises a swivel joint placed between the base mount and the elbow. Additionally or alternatively, the first base mount can be pivotally connected to the arm about an axis that is substantially parallel to the surface of the support base (or a tangential plane thereof).

Optionally, the first base mount is connected to the arm at a first end of the arm, e.g. a first end of the arm opposite that of a camera mount connected to a second end of the arm.

Optionally, the first base mount is connected to the arm by a plurality of joints. For example, the first base mount can be pivotally connected to the arm by a first joint that provides a first axis of movement and a second joint that provides a second axis of movement.

Optionally, the first base mount is connected to the arm by a joint that provides movement about a plurality of axes (e.g. a ball-in-socket joint).

Optionally, the first base mount is connected to the arm via an elbow. Optionally, the first base is pivotally connected to the elbow or the elbow is pivotally connected to the arm. Optionally, the first base is pivotally connected to the elbow about one or more axes (e.g. by a first joint and a second joint providing different axes of movement).

Optionally, the first base mount is pivotally connected to the base mount about a first axis and a plane thereof) to which the arm is connected and the second axis can impart movement of the arm along a plane that is substantially perpendicular with the second axis. For example, the first axis can impart movement of the arm along a plane that is substantially parallel with the surface of the support base (or a tangential surface of the support base (or a tangential plane thereof) to which the arm is connected. Optionally, in the range of movement about the first axis is substantially greater than the range of movement about the second axis. For example, the first axis optionally imparts a range of movement of about 180° to about 360° while the second axis optionally imparts a range of movement substantially less than 180° (e.g. less than about 90° or about 20° to about 70°). Optionally, the first axis is provided by a hinge joint. Optionally, the second axis is provided by hinge joint, or alternatively, a ball-in-socket joint which provides movement about a plurality (e.g. an infinite) number of axes.

Second Base Mount

A camera support of the invention comprises a second base mount is configured for releasably connecting ('coupling') to the arm. Accordingly, a camera support of the invention comprises at least one arm coupler for providing said coupling to the arm.

Optionally, the second base mount is coupled to the arm at a location intermediate of the first base mount and the camera mount.

Arm Coupler

Any arm coupler is useful in the present invention. The arm coupler can comprise any coupling mechanism that provides a releasable connection of the second base mount and the arm that allows the arm to be securely attached and detached from the second base mount a plurality of times, such that when the arm is attached to the second base mount, it is prevented from moving substantially relative to the second base mount.

Optionally, the arm coupler is any coupler that may be operated (i.e. attached and detached) by one hand of a user.

Optionally, the arm coupler comprises a coupling mechanism selected from a a strap, a clip, a magnet, an adhesive, or any fastener (e.g. hook and loop fastener, a buckle, or a fastener having a release button).

Optionally, the arm coupler comprises an arm coupler base and a strap configured to releasably secure the arm to the arm coupler base (i.e. releasably connect and prevent substantial movement between the arm and the coupler base when connected). Optionally, the strap is any member (e.g. rigid or flexible) that is laid over the arm to secure the arm to the coupler base. For example, the strap can be a resilient strap such as resilient strap having a resting position separated from the arm. Optionally, the arm coupler comprises a strap retainer. Optionally, the strap retainer is any fastener such as a pin (cross pin or through pin), a buckle, a hook, a button, adhesive, or a hook and loop fastener. Optionally, the strap comprises a first portion connected to the coupler base and a second portion connected to the strap retainer, wherein the strap retainer is configured to releasably connect the strap to the coupler base. Optionally, the coupler base comprises a guide configured to accept the arm, optionally wherein the guide comprise a cavity. An example of such an arm coupler is depicted din FIGS. 8A-8D.

Optionally, the arm coupler comprises an arm coupler base, a strap (e.g. resililient strap) configured to releasably secure the arm to the arm coupler base, a strap retainer comprising a first portion connected to the coupler base and a second portion connected to the strap retainer, wherein the strap retainer is configured to releasably connect the strap to the coupler base, wherein the strap retainer comprises a pin or other fastener that engages the coupler base, and the arm coupler comprises a push button that interacts with the pin or other fastener and can be pushed by the user to disengage the pin from the coupler base. Optionally, the coupler base comprises a passageway having a first end and a second end, wherein the pin or other fastener engages the coupler base about the first end of the passage way, and the push button extends through the passageway from the second end of the passageway to the pin. Optionally, the first end of the passage way comprises a lip configured to retain the pin in the passageway. Optionally, the pushbutton comprises a wedge configured to, upon the user pushing the pushbutton, contact the pin and separate the pin from the lip and push the pin from the first end of the passageway. Optionally, one or both of the passageway and the pushbutton comprises at least one groove along a passageway-pushbutton interface, wherein the at least one groove provides spacing between the passageway and the pushbutton. Optionally, when the arm is connected to the second base mount, the first end of the passage way and the second end of the passage way are on opposite sides of the arm. Optionally, the coupler base comprises a guide configured to accept the arm, optionally wherein the guide comprise a cavity or a protrusion (e.g. a protrusion configured to interact with a cavity optionally provided on the arm). An example of such an arm coupler is depicted din FIGS. 8A-8D.

Optionally, the arm coupler an arm coupler base and a strap (e.g. resilient strap) configured to releasably secure the arm to the arm coupler base, wherein the coupler base comprises a guide configured to accept the arm, optionally wherein the guide comprise a cavity. Optionally, the coupler base comprises a guide configured for acceptance of the strap, e.g. a groove in the mouth of an optional passage way of the arm coupler base. An example of such an arm coupler is depicted din FIGS. 8A-8D.

Optionally, the arm coupler comprises a resilient strap. A resilient strap is a strap that has a first resting position and can assume a second position by applying a force, and then returns to a resting position upon removing the force. A resilient strap can be biased to the resting position, e.g. based on the material of the strap (e.g. a preformed or molded conformation) or by a second component that applies a biasing for such as a spring (e.g. a spring loaded strap such as a spring loaded lever that can be closed over the arm to secure the arm to an arm coupler base). Optionally, the resilient strap has a resting position that is separated from the arm, e.g. such that the arm can be moved away from the arm coupler base without being impeded, entangled, or otherwise interfered with by the strap). Optionally, the resilient strap comprises a plastic cord (e.g. polyurethane) Optionally, the resilient strap is configured to stretch, i.e. elongate (e.g. an elastic strap) or bend (e.g. a polyurethane cord). Optionally, the resilient strap is configured to bend without substantial stretching (e.g. a polyurethane cord such as a surf leash cord material). Such a strap that bends without substantial stretching can provide a strong securing force to the arm, and for example, quickly return to a resting position when released from the coupler base. An example of such an arm coupler is depicted din FIGS. 8A-8D.

Optionally, the arm coupler comprises a clip configured for coupling to the arm. Optionally clip comprises interacting components (e.g. male and female components) that interact to provide the attached form of the coupler. Optionally, the clip is configured to embrace the arm. For example, the clip can comprise a pair of members (e.g. protrusions) that concave surfaces that oppose each other (e.g. forming a semi-circular or near-circular region) and are configured for embracing a portion of the arm (e.g. a cylindrical portion of the arm or a portion of the arm with a circular cross-section having a diameter substantially the same as the distance between the concave surfaces of the clip).

Optionally, the arm coupler is a magnetic coupler, i.e. comprises one or more magnets (e.g. permanent magnets or electromagnets). For example, the arm coupler can comprise a pair of magnetically interacting components (e.g. a pair of magnets or one magnet and one ferromagnetic metal), wherein one member of the pair is connected to the second base mount and the other member of the pair is connected to the arm. Optionally, the arm coupler comprises one or more magnets and further comprises a guide. For example, the guide can comprise a member (e.g. a protrusion such teeth or a cavity such as an indent) configured to aid in securing and/or positioning the arm about the magnetic coupler. As one example of a guide, the coupler can comprise one or more members having a concave surface that embraces or partially embraces the arm.

The arm coupler can be made of any material. For example, it can be made of a rigid material or a flexible material. Useful example of materials which can be used to provide an arm coupler include of metal, plastic, wood, rubber, and carbon fiber. For example, a clip such as a clip having a concave surface for embracing an arm can be made from any of said materials.

With the teachings herein, the skilled artisan can readily produce other arm couplers useful in the present invention.

Supportive Bases

According to the invention, a plurality of base mounts is configured for attachment to supportive bases. The supportive bases can be, for example, any structures that can support the arm. Optionally, the supportive bases to which the first and second base mounts are configured for attachment are portions of a common structure (e.g. a user's limb).

Optionally, one or both of the first supportive base and the second supportive base is a user's limb. Optionally the first supportive base and the second supportive base are portions of the same limb. Optionally, the limb is a human leg or a human arm. Optionally the first supportive base and the second supportive base are portions of the same forearm, e.g. the first supportive base is the wrist of the forearm and the second supportive base is an upper portion of the forearm.

Materials

A base mount useful in the present invention can be made of any material.

Optionally, the base mount made from natural material, a synthetic material, a plastic, a metal, a textile, a fabric (e.g. cloth), or any combination thereof.

Optionally, the base mount is strap configured to conform to the surface of the supportive base (a 'conformative' strap). Optionally, the conformative strap is made from a fabric, a leather, a flexible plastic, or rigid (e.g. metal) links that pivot about each other.

Optionally, the base mount is a strap and is made from water resistant, robust, synthetic fabric-like materials, e.g. often stitched or otherwise adhered together. Optionally, the strap comprises nylon fabric belting or neoprene. Optionally, the strap comprises a plurality of different layers of synthetic, water-resistant, material, some of which are optionally fabric or fabric-like. For example, the strap can comprise a first layer composed of a material such as neoprene, a second layer composed of a tough synthetic fabric and a third layer composed of a fabric hook-and-loop material such as Velcro®.

Leash

A camera support of the present invention optionally comprises one or more leashes configured to tether the camera mount or an optionally connected camera to another portion of the camera support, e.g. the camera or camera mount can be tethered to the arm, an optional elbow, or a base mount (e.g. the first base mount). Additionally or alternatively, the camera support can comprise a leash configured to provide a secure assembly mechanism for disconnectable members of the camera support (e.g. a modular arm with press-fit segments)

Optionally, the leash is flexible. For example, the leash can be a rope or cord (e.g. urethane cord).

Optionally, the leash comprises one or more loops or other connector for attachment to the camera or the camera mount, e.g. as illustrated in FIG. 4A.

For example, a loop can be provided by inserting the end of the leash through a ferrule, folding the leash back on itself to form a loop, inserting the end of the leash through the ferrule a second time, and crimping the ferrule to the leash (e.g. as illustrated in FIG. 4A) Optionally, the loop can be tethered onto a camera mount (e.g. a camera mount comprising a hinge, wherein the hinge's interacting members are separated, e.g. by removing a hinge pin, the loop is positioned over one of the interacting members, the hinge's interacting members are reconnected and, e.g. secured with the hinge pin.

As another example, a loop can be additionally or alternatively provided as an adjustable loop. In such an embodiment, the camera support optionally comprises a releasable leash stop (e.g. illustrated FIG. 4A). For example, the leash stop can be a small hole or other stay device (e.g. a cam cleat, e.g. as used to secure sailing ropes) through which the leash can be threaded after looping through a member of a camera mount (e.g. cross bar or ring) and pulled tight to secure the camera mount. Optionally, one end of the leash is connected to the first base mount, e.g. such that upon tightening the leash the camera mount is forcibly secured to the arm, which is in turn forcibly secured to the first base mount. Such a configuration can optionally also be used as a securing mechanism to secure not only the camera mount to the arm, but also the arm to the first base mount (e.g. in a modular camera support or a camera support that with component that slide into each other.)

Optionally, the leash comprises a first loop (e.g. in the end of the leash) configured for attachment to a camera or camera mount (e.g. a ferruled loop configured, e.g. for attachment about a camera mount hinge as described above) and further comprises a second loop at a location intermediate the first loop and the portion of the camera support to which the other end of the leash is connected (e.g. first base mount), wherein the second loop is configured for securing (e.g. forcibly securing or securing via applying opposing forces to secure components together) another portion of the camera mount to the portion of the camera support to which the other end of the leash is connected (e.g. as detailed in the preceding paragraph). Such a configuration is illustrated in FIG. 4A), for example by providing the second loop as an adjustable loop such that the loop can be adjusted to tighten the leash and forcibly secure one portion of the camera support (e.g. camera mount) to another (e.g. the arm).

Figure 10:
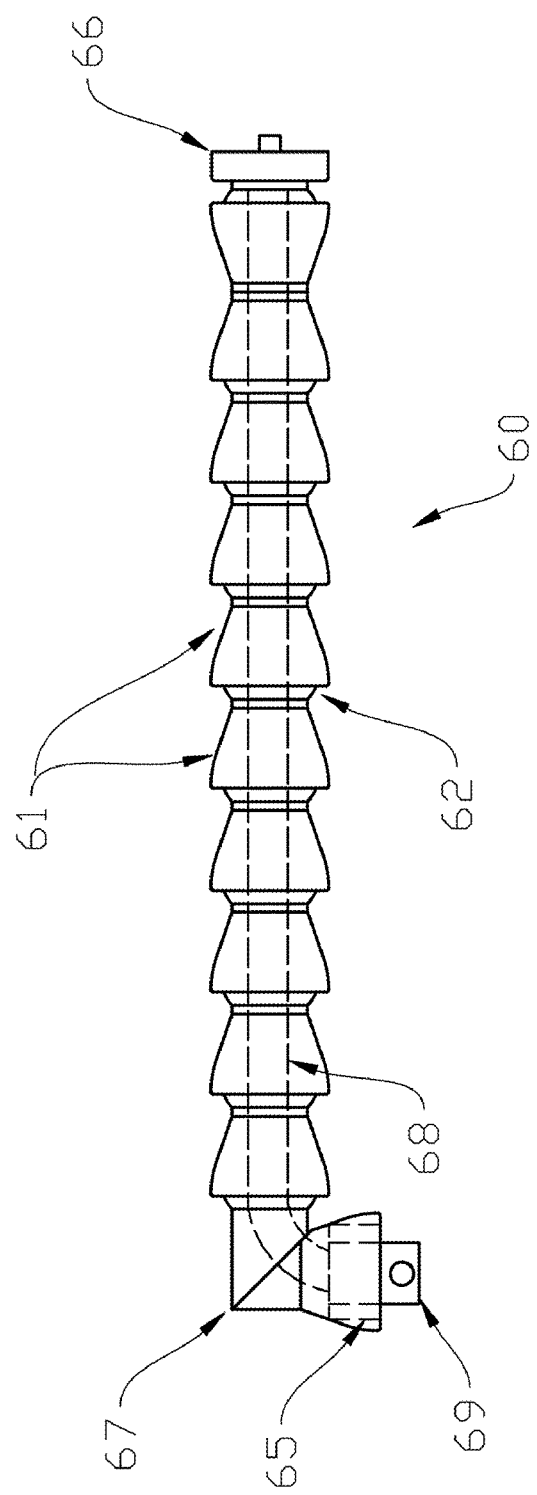
FIG. 10 depicts a portion of a camera support comprising a leash running through the arm.

Optionally, the camera support comprises a tubular arm, and at least a portion of the leash runs through the tubular arm, e.g. as illustrated in FIG. 4A and FIG. 10.

Optionally, the leash is under tension. Optionally, the arm comprises a plurality of arm segments that are connected by joints, and the leash under tension forces the arm segments together, thereby producing a semi-secure joint and/or the resistance of the joints. An example of such a leash under tension and segmented arm is depicted in FIG. 10.

Camera Remote

A camera support of the invention is optionally configured for attachment to ta camera remote control. Optionally, the first base mount or the second base mount is configured for attachment to the remote control.

Optionally, the camera support comprises a remote control mount. Any remote control mount is useful in the present invention. For example, the remote control mount can include a strap or a tether configured to secure a remote control. As one example, the first base mount (e.g. a strap configured for attachment to a user's arm) comprises a remote control mount.

Camera

A camera support of the invention can be connected to any camera. Optionally, the camera mount is configured for attachment to the camera. Optionally, the camera support comprises a camera. Optionally, the camera is a video camera.

Optionally, the camera has a wide angle lens.

Optionally, the wide angle lens has an angle of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees.

Optionally, the camera is configured to capture an image with a field of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees.

Examples of useful camera include those distributed by GoPro® such as any of the Hero® line of cameras.

Methods of Use

A camera support of the invention can be used in any manner. Optionally, a camera support of the invention is used in a sport. Optionally, the sport is a board sport, e.g. the user is a surfer, a snowboarder, a skateboarder, or a water sports boarder.

Optionally, a method of use comprises:
a. mounting the camera support to a user, e.g. by mounting the first base mount to the user's wrist and the second base mount to the user's upper forearm;
b. releasing the arm from the coupler connected to the second base mount; and
c. positioning the arm in the user's hand.

Optionally, the method comprises recording a video with the camera.

Optionally, the step of positioning the arm in the user's hand comprises allowing the arm to swing down under the force of gravity.

Optionally, the step of positioning the arm in the users hand comprises pivoting the arm about a plurality of axes relative to the first base mount.

Another embodiment of the invention provides a method of producing a video comprising:
a. mounting a camera support to a user, e.g. by mounting (e.g. strapping) the first base mount to the user's wrist and the second base mount to the user's upper forearm; and
b. recording a video using the camera.

Optionally, the method comprises, after mounting the camera support to the user and prior to recording the video,
a. releasing the arm from the coupler connected to the second base mount; and
b. positioning the arm in the user's hand.

Another embodiment of the invention provides a video produced according to a method of the invention, e.g. as taught above.

Another embodiment of the invention provides a video produced from a camera mounted on a camera support of the invention. Optionally, the camera support is mounted to a user, e.g. strapped to a user's arm.

Videos of the invention can be recorded on, for example, any media such as a non-transitory memory (e.g. EEPROM such as flash memory), a compact discs, or a DVD.

Optionally, a video produced according to the invention is produced using a wide angle lense (e.g. a GoPro®).

EXAMPLE EMBODIMENTS

Among the various embodiments contemplated herein are the example embodiments ("EEs") listed below.

1. A camera support comprising:
   a. an arm;
   b. a camera mount connected to the arm;
   c. a mount configured for attachment to a first supportive base ('first base mount'), wherein the arm is pivotally connected to the first base mount about a first axis;
   d. a mount configured for attachment to a second supportive base ('second base mount'); and
   e. a coupler configured for releasably connecting the arm to the second base mount ('arm coupler).
2. The camera support of EE 1, wherein the arm is pivotally connected to the first base mount about a second axis, wherein the second axis is different than the first axis, optionally wherein the first axis and the second axis are substantially perpendicular to each other.
3. The camera support of any preceding EE, wherein at least one of the distance and the angle of the arm relative to the first supportive base is substantially constant upon pivoting of the arm about the first axis.
4. The camera support of EE 2 or EE 3, wherein at least one of the distance and the angle of the arm relative to the first supportive base changes substantially upon pivoting of the arm about the second axis.
5. The camera support of the preceding EE, wherein the range of motion of the arm about the first axis is substantially greater than the range of motion of the arm about the second axis.
6. The camera support of preceding EE, further comprising an elbow between the first base mount and the arm.
7. The camera support of the preceding EE, further comprising a first swivel joint between the elbow and the first base mount, optionally wherein said first swivel joint provides said first axis.
8. The camera support of the preceding EE, further comprising a first pivot joint connecting the first swivel joint to the first base mount, optionally wherein said first pivot joint provides said second axis.
9. The camera support of the preceding EE, wherein the first pivot joint comprises a hinge or a flexible member.
10. The camera support of any of EEs 1-7, further comprising a first pivot joint connecting the arm and the first base mount, wherein the first pivot joint provides an axis that is different than the first axis, optionally wherein said first pivot joint provides said second axis according to EE 2.
11. The camera support of the preceding EE, wherein the first pivot joint comprises a hinge or a flexible member, optionally wherein the flexible member is a strap provided as the first base mount.
12. The camera support of EE 2, further comprising a ball-in-socket joint connecting the arm and the first base mount, wherein the ball-in-socket joint provides said first axis and said second axis.
13. The camera support of any preceding EE, wherein the second base mount is connected to the arm at a location intermediate of the first base mount and the camera mount.
14. The camera support of the preceding EE, wherein the first base mount is connected to the arm at a first end of the arm and optionally, the camera mount is connected to the arm at a second end of the arm.
15. The camera support of any preceding EE, wherein each of the first base mount and the second base mount are configured for being attached and detached from the respective supportive bases.
16. The camera support of any preceding EE, wherein the first base mount is movable relative to the second base mount.
17. The camera support of any preceding EE, wherein each of the first base mount and the second base mount comprises a strap, optionally wherein each of the straps is configured for attachment to a user of the camera support.
18. The camera support of the preceding EE, wherein one or both of the first supportive base and the second supportive base is a user's limb, optionally wherein the first supportive base and the second supportive base are portions of a limb.
19. The camera support of the preceding EE, wherein the limb is a human leg or a human arm.
20. The camera support of the preceding EE, wherein the first supportive base and the second supportive base are portions of a human forearm.
21. The camera support of any preceding EE, wherein the arm coupler comprises a clip, a magnet, a strap, or a combination thereof.
22. The camera support of any preceding EE, further comprising a swivel joint connecting the arm to the camera mount ('camera swivel joint').
23. The camera support of any preceding EE, wherein the camera mount comprises a screw, optionally wherein the screw is selected from, ¼-20 UNC, ⅜-16 UNC, ¼-20 BSW, and ⅜-16 BSW.
24. The camera support of any preceding EE wherein the camera mount comprises a hinge or a partial hinge or wherein the camera mount is pivotally connected to the arm by a hinge.
25. The camera support of any preceding EE, wherein the camera mount comprises a camera case.
26. The camera support of the preceding EE, wherein the camera case is waterproof.
27. The camera support of any preceding EE, further comprising a camera mounted on the camera mount.
28. The camera support of the preceding EE, wherein the camera is a video camera.
29. The camera support of any of the two preceding EEs, wherein the camera has a wide angle lens.
30. The camera support of the preceding EE, wherein the wide angle lens has an angle of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees.
31. The camera support of any of the preceding three EEs, wherein the camera is configured to capture an image with a field of view selected from at least 75 degrees, at least 100 degrees, at least 120 degrees, at least 140 degrees, at least 150 degrees, at least 160 degrees, 80 degrees to 180 degrees, 90 degrees to 175 degrees, and 120 degrees to 180 degrees.
32. The camera support of any of the preceding EEs, further comprising a leash, wherein the leash tethers the camera mount or a camera to another portion of the camera support.
33. The camera support of the preceding EE, wherein the portion of the camera support is selected from the first base mount, an elbow, or the second base mount.
40. The camera support of any of any preceding EE, wherein the arm coupler comprises:
  a. an coupler base;
  b. a strap configured to releasably secure the arm to the coupler base.
41. The camera support of EE 40, wherein:
  a. the arm coupler comprises a strap retainer;
  b. the strap comprises a first portion connected to the coupler base and a second portion connected to the strap retainer, wherein the strap retainer is configured to releasably connect the strap to the coupler base.
42. The camera support of EE 41, wherein:
  a. the strap retainer comprises a pin that engages the coupler base; and
  b. the arm coupler comprise a push button that interacts with the pin and can be pushed by the user to disengage the pin from the coupler base.
43. The camera support of EE 42, wherein:
  a. the coupler base comprises a passageway having a first end and a second end;
  b. the pin engages the coupler base about the first end of the passage way; and
  c. the push button extends through the passageway from the second end of the passageway to the pin.
44. The camera support of EE 43, wherein the first end of the passage way comprises a lip configured to retain the pin in the passageway.
45. The camera support of EE 44, wherein the pushbutton comprises a wedge configured to, upon the user pushing the pushbutton, contact the pin and separate the pin from the lip and push the pin from the first end of the passageway.
46. The camera support of any of EEs 43-45, wherein one or both of the passageway and the pushbutton comprises at least one groove along a passageway-pushbutton interface, wherein the at least one groove provides spacing between the passageway and the pushbutton.
47. The camera support of any of EEs 43-46, wherein, when the arm is connected to the second base mount, the first end of the passage way and the second end of the passage way are on opposite sides of the arm.

48. The camera support of any of EEs 40-47, wherein the coupler base comprises a guide configured to accept the arm, optionally wherein the guide comprise a cavity.
49. The camera support of any of EEs 40-47, wherein the strap is a resilient strap.
50. The camera support of EE 49, wherein the resilient strap has a resting position that is separated from the arm.
51. The camera support of EE 50, wherein the resilient strap comprises a plastic cord, optionally wherein the plastic cord comprises polyurethane.
52. The camera support of any of EEs 40-51, wherein the coupler base comprises a guide configured for acceptance of the strap.
53. The camera support of EE 52, wherein the guide configured for acceptance of the strap comprises a groove in the mouth of the second end of the passage way.
60. The camera support of any of the preceding EEs, wherein the arm is non-linear.
61. The camera support of EE 60, wherein the arm comprises one or more angles.
62. The camera support of EE 61, wherein the one or more angles are adjustable angles.
63. The camera support of EE 62, wherein each of the one or more adjustable angles is provided by a semi-secure joint or a securable joint.
64. The camera support of EE 62, wherein the arm comprises a first arm segment and a second arm segment connected by a first arm segment joint, wherein the first arm segment joint is a securable joint or a semi-secure joint.
65. The camera support of EE 63, wherein the arm comprises a third arm segment connected to the second arm segment by a second arm segment joint, wherein the second arm segment joint is a securable joint or a semi-secure joint.
66. The camera support of EE 63, wherein the arm comprises a fourth arm segment connected to the third arm segment by a third arm segment joint, wherein the third arm segment joint is a securable joint or a semi-secure joint.
67. The camera support of EE 63, wherein the arm comprises a fifth arm segment connected to the fourth arm segment by a fourth arm segment joint, wherein the fourth arm segment joint is a securable joint or a semi-secure joint.
68. The camera support of any of EEs 60-67, wherein the arm is shaped such that the first base mount can be mounted to the wrist of a user and the second base mount can be mounted to the forearm of the user, wherein the connection angle of the arm to the first base mount and the connection angle of the arm to the second base mount are substantially different, optionally, wherein the connection angles are substantially perpendicular.
69. The camera support of any of EEs 60-68, wherein the arm is shaped such that the first base mount can be mounted to the wrist of the user with the connection of the first base mount to the arm extending from the side of the wrist and the second base mount can be mounted to the forearm of the user with the connection of the second base mount to the arm extending from the top of the forearm.

EXAMPLES

Example 1

Camera Support

FIG. 1A and FIG. 1B depicts front and rear perspective views of a camera support 1 of the invention. The camera support 1 comprises a first base mount 4 configured for attachment to ta first supportive base, an arm 2 pivotally connected to the first base mount 4 by joints 7,8, a camera mount 3, a second base mount 5 configured for attachment to second supportive base, and an arm coupler 9 configured for releasably connecting (i.e. connecting and disconnecting) the arm 2 from the second base mount 5, and an elbow 6 connecting the arm to the first base mount 4. The camera mount 3 comprises a camera case 12, which is connected to the arm by a swivel joint 10 and a pivot joint 11.

Figure 5:
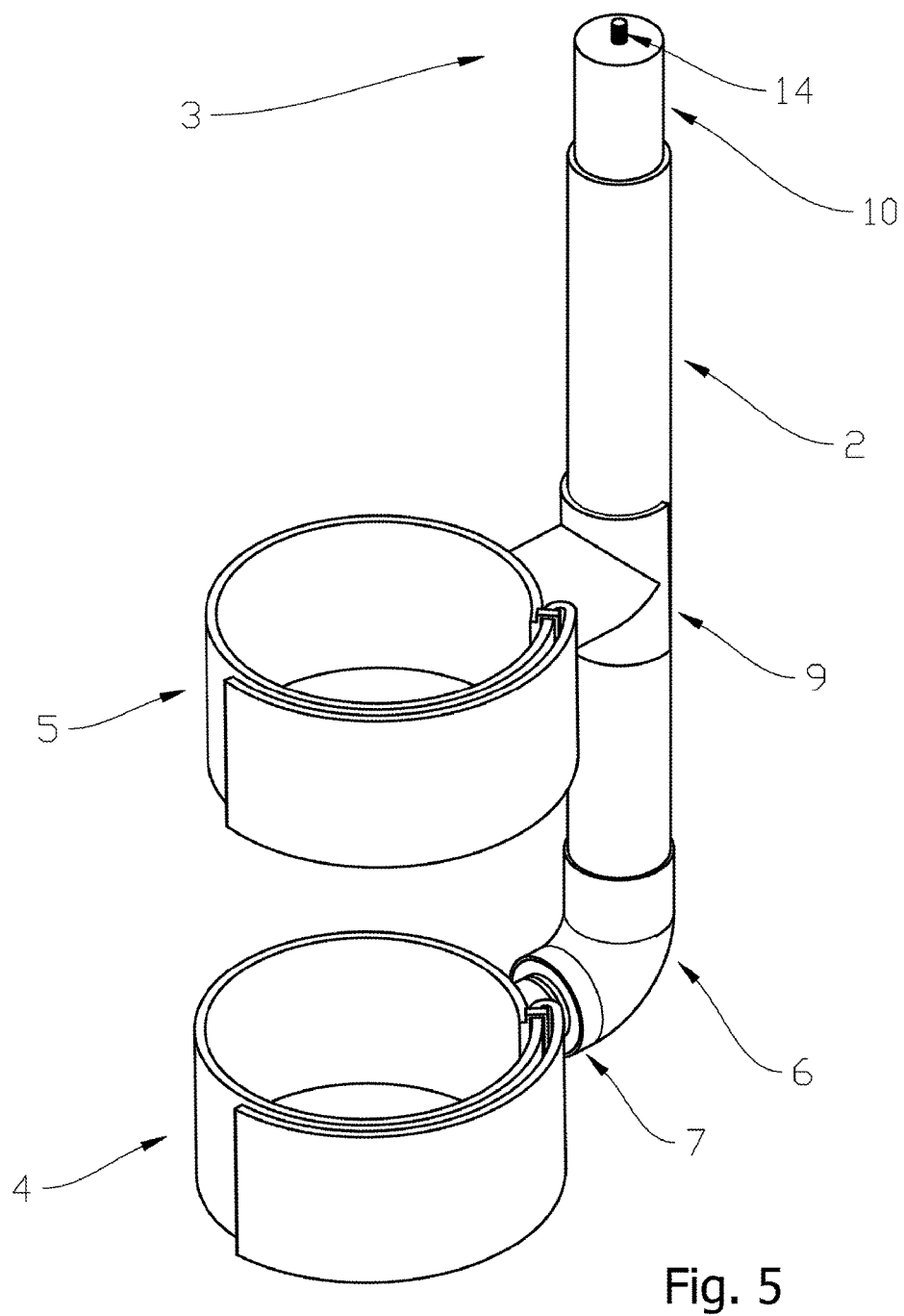
FIG. 5 depicts a camera support of the invention.

FIG. 5 depicts a similar camera support 1 having a threaded screw 14 as a camera mount (e.g. a ¼-20 screw, i.e. ¼ inch diameter screw having 20 threads per inch), which is configured to accept the female threaded hole of a camera or a second camera mount (e.g. a hinged camera mount).

Figure 7:
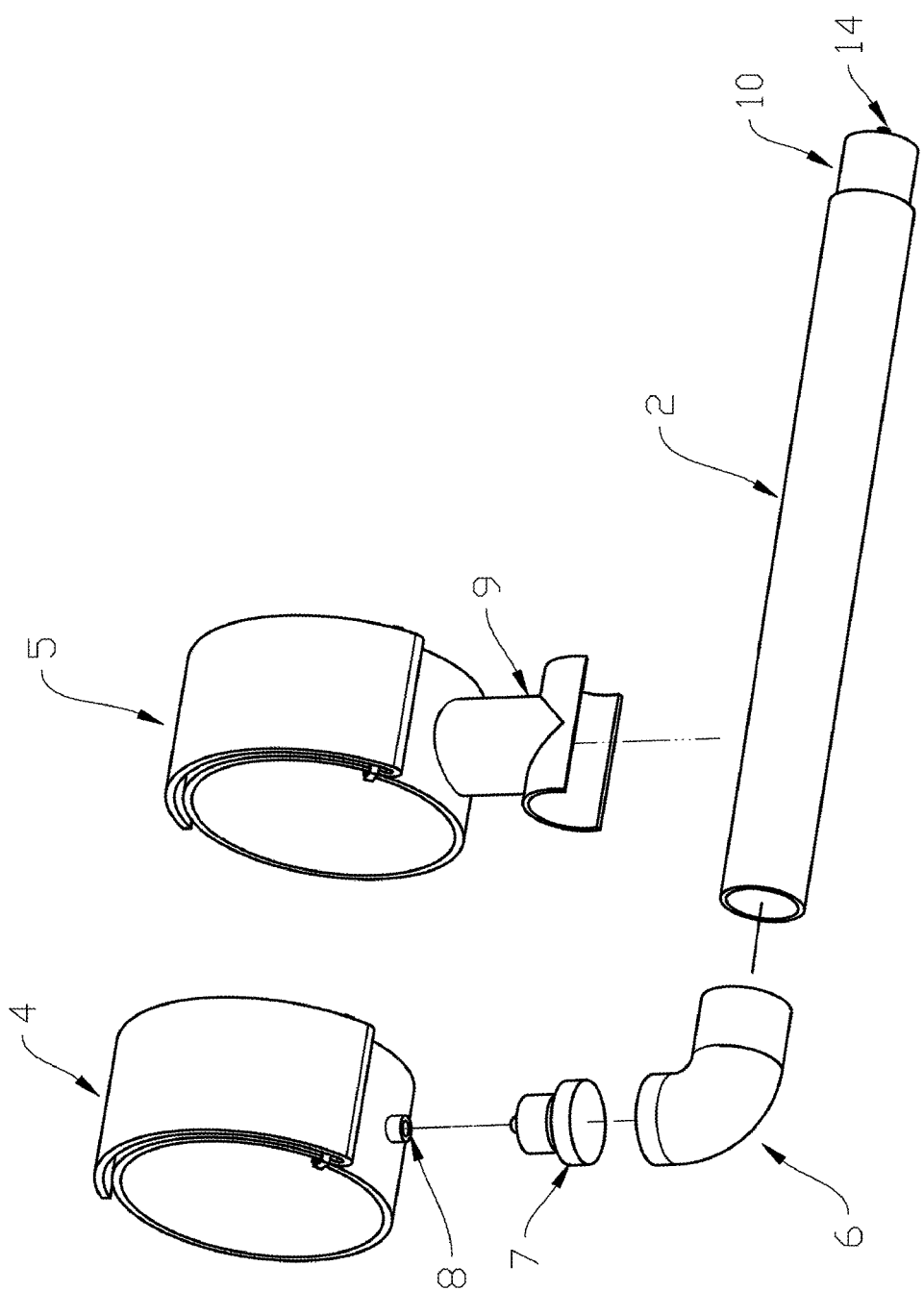
FIG. 7 depicts an exploded view of a camera support of the invention

FIG. 7 depicts an exploded view of the camera support 1. The connection between arm coupler 9 and arm 2 is releasable. The other connections shown as exploded, i.e. the connection between arm 2 and elbow 6, elbow 6 and swivel joint 7, and swivel joint 7 and socket 8 are optionally permanent or releasable. FIG. 7 depicts a socket 8 to form a ball-in-socket joint between the first base mount and the swivel joint 7. However, another useful example of a joint that can be used rather than a ball in socket joint is a flexible member. For example, first base mount 4 can comprise a flexible strap configured for attachment to a supportive base (e.g. a user's wrist). In this example, the connection between the base mount 4 and the swivel joint 7 can be configured such that the flex in the strap (or other flexible member) can impart pivotal movement to the swivel joint 7 and connected arm 2.

Figure 3C:
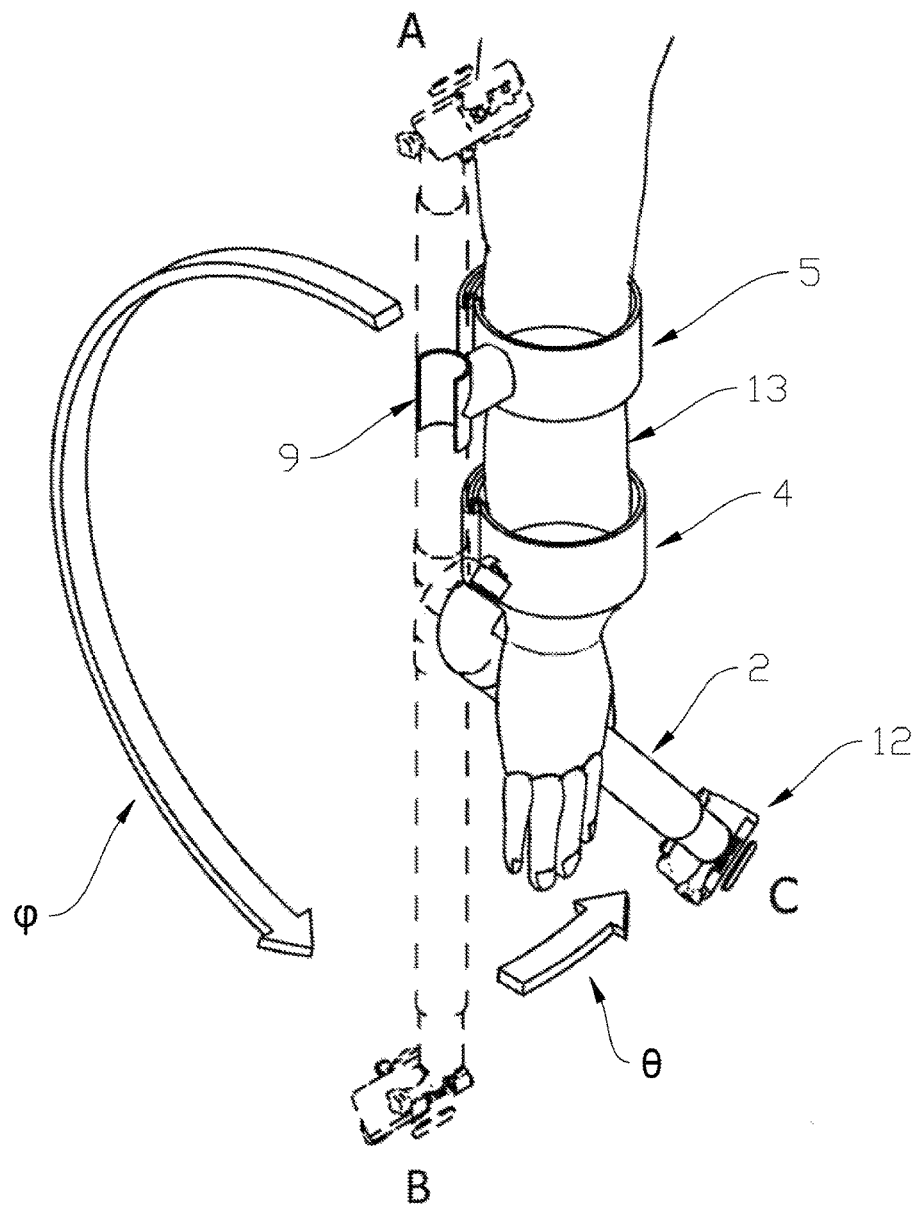
FIG. 3C depicts a perspective showing three optional positions of a camera support of the invention.
Figure 6B:
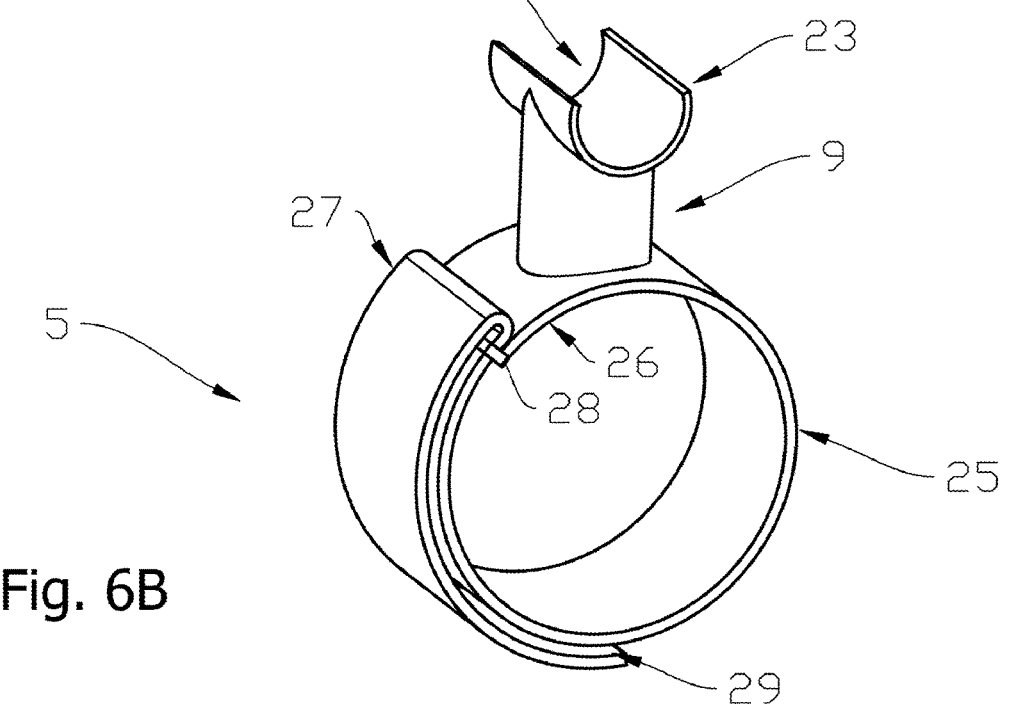
FIG. 6B depicts a perspective view of a second base mount and arm coupler useful in a camera support of the invention.

FIG. 6A and FIG. 6B illustrate a useful strap 25 that can be provided as a base mount 5 with attached arm coupler 9. The strap 25 comprises a first strap end 26 having a ring 28 and a second strap end 27 configured for insertion through the ring 28, folded back and pulled back towards the middle of the strap to provide a tightening mechanism in a slip-knot fashion when the strap is mounted to a supportive base such as a user's forearm (e.g. wrist or upper forearm). As a fastening mechanism, the strap 25 comprises a hook and loop fastener with a strip of hook 29 that interacts with a strip of loop 30 to secure the strap. Although not detailed in FIG. 6A and FIG. 6B, the first base mount 4 has a strap with the same configuration. Base mounts having straps can optionally be configured for mounting on a user's forearm, e.g. as illustrated in FIG. 3A-C.

As further illustrated in FIG. 6A and FIG. 6B, an arm coupler 9 is provided for releasably connecting an arm (e.g. arm 2 as shown in FIG. 5) to the second base mount 5. In this example, the arm coupler 9 is shown as a clip configured to embrace the arm by providing one more members 23 with a concave surface 24. Member 23 is semi-rigid having a small amount of flexibility and forms a cavity having semi-circular or near-circular region to accept with a snug fit the cylindrical arm 2. With such an arm coupler, the arm can be connected by inserting the arm 2 into concave surface 24 of the cavity form by the semi-rigid member 23. Release of the arm 2 from the coupler 9 is accomplished by applying a sufficient force such that semi-rigid member 26 flexes a small mount to remove the arm 2 from the cavity. A magnet can optionally be provided in the arm coupler, e.g. in the concave surface 24 (not shown) for providing an additional or alternative coupling mechanism for a releasable connection an arm.

The width of the arm is optionally configured for grasping in a user's hand. For example, the width (e.g. diameter of the arm) of the arm or a hand grip portion thereof, can be about 1 cm to about 6 cm such as about 1.5 cm to about 3.5 cm.

The length of the arm is optionally about 15 cm to about 50 cm (e.g. about 30 cm).

As depicted in FIGS. 3A-3C, the camera support taught in this example can optionally be configured such that the camera and entire arm can be placed about the side of the forearm. Such a mode of mounting can enhance safety in certain scenarios. For example, if a user falls of their sport board while participating in a land sport (e.g. skateboarding or snowboarding), the user might fall on their forearm or their forearm might swing and hit them in the face. Mounting of the camera and the arm to the side of the forearm rather than the top of the arm reduces the likelihood that the that the camera or arm injures the user in the case of a fall.

Example 2

Axes of Movement

FIG. 2 depicts examples of axes of rotation which can be provided by joints of a camera support of the invention, e.g. a camera support detailed in Example 1 or a camera support detailed Example 11. As illustrative examples shown in FIG. 2, the camera support can one or more of joints 7,8, 10, and 11. For example, a camera support of the invention can comprise one or both of joints 7 and 8 that connect the arm 2 to the first camera support 4. Optionally, the camera support further comprises joint 10 connecting a camera mount (or camera) to the arm 2. Optionally, the camera support further comprises joint 11 connecting a camera mount (or camera) to the arm 2.

As illustrated in FIG. 2, each joint optionally provides a different axis of rotation. FIG. 2 depicts arrows corresponding to the movement of members that are connected by a respective joint. Specifically, joint 7 imparts an axis of rotation $\phi$ (phi), joint 8 imparts axis of rotation $\theta$ (theta), joint 10 imparts axis of rotation $\psi$ (psi), and joint 11 imparts axis of rotation $\alpha$ (alpha).

Joint 7 can optionally be a swivel joint which imparts rotational movement about axis $\phi$ (phi) of the connected members relative to each other, e.g. the connected end of the elbow relative to the connected end of joint 8. Accordingly, such a joint 7, imparts pivotal movement of arm 2 about axis $\phi$ (phi), which is connected to joint 7 by elbow 6, and also imparts revolution of the camera case 12 about axis $\phi$ (phi). The movement of arm 2 about axis $\phi$ (phi) can be, e.g. substantially parallel to the surface of the supportive base to which the base mounts are mounted (e.g. parallel to a plane that is tangential to the forearm at a location to which the arm is connected). Accordingly, the swivel joint provides a useful arm joint. As an alternative to the swivel joint 7, a pivot joint can be provided having the same axis of rotation, e.g. without an intermediate elbow 6 connecting the joint and the arm 2.

Joint 8 can optionally be a pivot joint (e.g. a hinge, a ball in socket joint, or a joint imparted by the flexible nature of the first base mount 4) which imparts pivotal movement about axis $\theta$ (theta) of the connected members relative to each other, e.g. the first base mount 4 and the swivel joint 8 relative to each other. Accordingly, such a joint 8, imparts pivotal movement of arm 2 about axis $\theta$ (theta) and also imparts revolution of the camera case 12 about axis $\theta$ (theta). The movement of arm 2 about axis $\theta$ (theta) can be, e.g. substantially perpendicular to the surface of the supportive base to which the base mounts are mounted (e.g. perpendicular to a plane that is tangential to the forearm at a location to which the arm is connected). Accordingly, the pivot joint provides a useful arm joint. When combined in a camera support with joint 7, the range of movement of the arm 2 about joint 8 is substantially less than that joint 7. In this configuration, the relatively reduced range of movement about joint 8 allows the arm to be oriented within the user's palm (e.g. as discussed in Example 3), even, e.g. provided a substantially straight arm 2.

Joint 10 can optionally be a swivel joint which imparts rotational movement about axis $\psi$ (psi) of the connected members relative to each other, e.g. rotation the connected end of the camera mount 3 relative to the connected end of arm 2. Accordingly, the swivel joint provides a useful camera joint. The swivel joint can be, e.g. a joint that remains fixed without user manipulation (e.g. has a fixing device such as a lock or has substantial friction such that the joint does not move on its own without user intervention).

Joint 11 can optionally be a pivot joint (e.g. a hinge) which imparts pivotal movement about axis $\alpha$ (alpha) of the connected members relative to each other, e.g. the camera case 12 and the arm 2. Accordingly, the pivot joint provides a useful camera joint. The pivot joint can be, e.g. a joint that remains fixed without user manipulation (e.g. has a fixing device such as a lock or has substantial friction such that the joint does not move on its own without user intervention).

Example 3

Method of Use

FIG. 3A-FIG. 3C depict various optional positions of a camera support of the invention while in use by a user. As illustrated movement of the camera support from position to position occurs via movement about arm joints about axes $\phi$ (phi) and $\theta$ (theta).

As illustrated in the starting position of FIG. 3A (a front view of the camera support), the user wears the camera support on his forearm 13, with first base mount 4 strapped to his wrist and second base mount 5 strapped to his upper forearm 5. Initially, the arm 2 is in connected to the second base mount 5 via an arm coupler. With the arm in this position, the user can position the camera by moving his arm. For example, the user can lift his forearm and/or retract his elbow orient the camera looking forward and provide a point of view ('POV') nearly that of his own eyes (i.e. first person).

When the user wishes to change the POV, the user disconnects the arm 2 from the arm coupler, lets his arm hang down in a natural fashion, and allows the arm to swing down (i.e. pivot) about axis $\phi$ (phi) under the force of gravity acting on the arm 2 as illustrated the second position shown in FIG. 3A. In this example, based on the position of the user's forearm, this second position in FIG. 3A is transient and instantaneous, because the arm 2 can further swing into the user's palm about axis $\theta$ (theta) as illustrated in FIG. 3B (a side view of the camera support) upon a slight rotation of the wrist to open the user's palm relative to the arm 2 or a slight angle of the forearm towards the user's rear. The start position (labeled 'A), finish position (labeled ('C), and transient and instantaneous intermediate position (labeled 'B') are also illustrated in the perspective view detailed in FIG. 3C. In the final position, the user grasps the arm 2 of the camera support and can position the camera as desired, e.g. with the users hand extended away from the user's body in front (e.g. looking back at the user) or in back (e.g. looking forward at the user). As an alternative to providing substantial movement about axis θ (theta), the arm can be non-linear with curves or hard angles such that a portion of the arm is placed in the hand after the arm as swung about axis φ (phi) (e.g. the non-linear arm of the camera support depicted in FIGS. 12 and 14 and detailed in Example 11).

Accordingly, a camera support of the invention provides the user (e.g. a surfer or other sports boarder) with numerous POVs that may be quickly interchanged. Further, the starting position (i.e. when the arm 2 is connected to the second base mount 4) provides a hands-free configuration in which the user's hand is free from holding the arm 2 (e.g. to use for paddling as in surfing, or balancing as in sports boarding in general).

Example 4

Camera Support with Leash

FIGS. 4A and 4B depict a portion of a camera support of the invention (i.e. the arm, elbow, and camera mount) that further comprises a leash. In the illustrated example, the leash is configured to provide two functions, 1) the leash is configured to tether a camera to the camera support by a second mechanism in case the camera becomes detached from the camera mount (e.g. if a camera becomes unscrews from a camera mount screw); and 2) to provide a secure assembly mechanism for a camera support having disconnectable parts (e.g. a modular camera support wherein the camera mount can be disconnected from the arm and/or the arm can be disconnected from the first base mount).

As illustrated in FIG. 4A the leash 15 has a first end with a first loop 20 formed by ferrule 22. The loop 20 can be connected to a camera or a camera mount to ensure that the camera is not lost by the user in the event the camera becomes detached from the camera mount or the camera mount becomes detached from the arm. The second end of the leash is fixed to the end the elbow that is connected to swivel 7 and runs inside a tubular elbow 6 and up arm 2, and loops around an attachment point 18 (e.g. a bar as shown in FIG. 4A or a ring as shown in FIG. 4B) forming a second loop 17 and back down inside arm 2, where it exits the elbow through a small hole 20 that is smaller in diameter than the leash 15, which allows the hole 20 to act as releasable leash stop in that it secures the leash in position. The second loop is adjustable in that the user may pull on the first end of the leash which causes the length of leash inside the arm to shorten and forcibly secure the swivel joint 10 (and attached screw 14 of a camera mount) to the arm 2, which is in turn forcibly secured to the elbow 6. The diameter of hole 20, being less than that of the leash 15, induces friction on the leash and secures the leash 15 in it's now short and tightened state. Although the swivel joint 10 is forcibly secured to the arm 2, the swivel joint 10 can still rotate about the arm 2. The user can release the leash by using sufficient force to push the outer portion of the leash back into the tubular elbow.

Another example of a useful leash is shown FIG. 10.

Example 5

Camera Support

A camera support as detailed in Example 1 having a leash as detailed in Example 5 was made.

As the arm 2, a 12 inch section of ¾ Polyvinyl chloride ('PVC') pipe (having an outer diameter of 1 inch) was obtained (e.g. as shown in FIG. 4A). As the elbow, a ¾ PVC 90° elbow was obtained (e.g. as shown in FIG. 4A). As the camera swivel joint 10, a ¾ PVC end cap was obtained and provided with a lateral bar 18 (e.g. as shown in FIG. 4A). As the camera mount 14, a ¼-20 screw was secured vertically extending from the ¾ PVC end cap (e.g. as shown in FIG. 4A).

To provide the first base mount, a first surf board leash and cuff (i.e. strap) was obtained that had a flexible strap and a leash extending therefrom on a swivel joint which was used as swivel joint 7 (the leash and swivel were as shown in FIG. 4A). The surf leash was cut to obtain leash 15 (as shown in FIG. 4A). The cuff of the leash provided a flexible strap such that the attached leash was able to pivot about the strap (thereby providing pivot joint 8) in addition to being able to swivel about swivel joint 7.

The leash 15 was inserted through the elbow and fixed thereto, and then inserted up through the arm and looped up and back down over bar 18 of the swivel joint 10 (PVC end cap) and exited the elbow through a small hole 20, and then provided a loop 21 at its end (as shown in FIG. 4A). The leash 15 was then pulled tight forcibly securing the swivel joint 10 (PVC end cap) to the arm 2 and the arm 2 to the elbow 6.

To provide the second base mount, a second surf board leash and cuff was obtained and the leash was cut completely off, leaving only the cuff, which was used as a strap for the second base mount. As an arm coupler 9, a ⅝ PVC T-connector was obtained. Slightly less than half of the top of the T-connector was cut, thereby providing a member 23 with a concave surface 24 (as shown in FIGS. 6A and B). The PVC of the T-connector was rigid but slightly flexible allowing it to clip onto the ⅝ PVC arm 2. The bottom of the T connector was secured to the strap of the second surfboard leash.

The first and second base mounts (surf leash straps) were then mounted on a user's forearm as a camera support and the user tested the camera support. Many superior properties were surprisingly discovered, e.g. as detailed in the following example.

Example 6

Superior Properties

As detailed herein, a camera supports of the invention can have many configurations in which optional components taught herein are provided independently or in concert to provide one or more superior properties. For example:

Surprisingly, a camera support of the invention comprising a first base mount 4 pivotally connected to the arm 2, and a second base mount releasably connected by an arm coupler provides a quick and efficient configuration for providing a plurality of interchangeable POVs for a camera.

Surprisingly, a camera support of the invention comprising base mounts configured for attachment to a user, such as by providing the base mounts as straps or other harness, a camera support of the invention worn by a user, allows both hands-free and manual (e.g. in-hand) POVs that are selectable at-will by the user.

Surprisingly, a camera support of the invention comprising base mounts configured for attachment to a user's limb (e.g. forearm), such as by providing the base mounts as straps, a camera support of the invention worn by a user allows the arm to swing smoothly in a downward motion directly into the palm of the user.

Surprisingly, a camera support of the invention comprising a joint imparting movement (e.g. a flexible member, a hinge, or a ball-in-socket joint) of the arm 2 substantially perpendicular to a plane that is tangential to the forearm at a location to which the arm 2 is connected provides an ergonomic design that allows the user to comfortably grasp the arm 2 with his palm (e.g. without contorting his wrist), e.g. as illustrated in FIG. 3B.

Surprisingly, a camera support of the invention comprising an elbow connecting the arm 2 and the first base mount 2 can be used to impart spacing between the arm 2 a first base mount 2 (e.g. strap) connected to the user's forearm above his palm, thereby providing an ergonomic design that orients the arm comfortably in the user's palm, e.g. as illustrated in FIG. 3B.

Surprisingly, a camera support of the invention comprising a plurality of arm joints and/or a plurality of axes of rotation about which an arm 2 can move relative to a first base mount 4, provides an easily maneuverable arm 2 that can be placed in a plurality of positions at-will by the user.

Surprisingly, a camera support of the invention comprising one or more camera joints (e.g. a swivel joint or pivot joint connecting a camera mount or camera to the arm), allow a user to easily manipulate the line of sight of the camera when the arm is in any position, e.g. when the arm is connected to the second base mount and/or when the arm is released from the second base mount (e.g. in a user's hand).

Surprisingly, a camera support of the invention optionally provides a plurality of POVs selected from: first person point of views while hands free or handheld, a "selfie" point of view while handheld, and a third person point of view while handheld or while hands free (e.g. handsfree with the camera coupled and the users forearm drawing bad behind his head).

Example 7

Arm Coupler

Figure 8A:
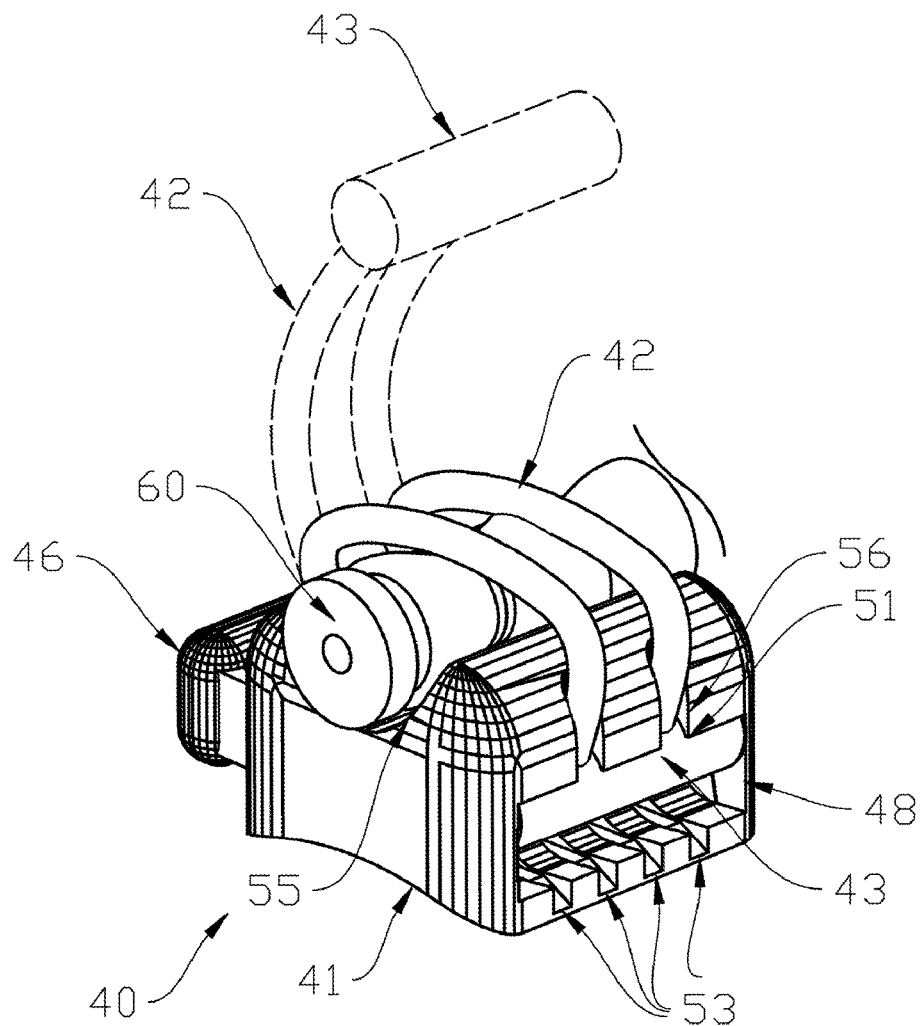
FIG. 8A through FIG. 8D depict an arm coupler useful in the present invention.
Figure 8B:
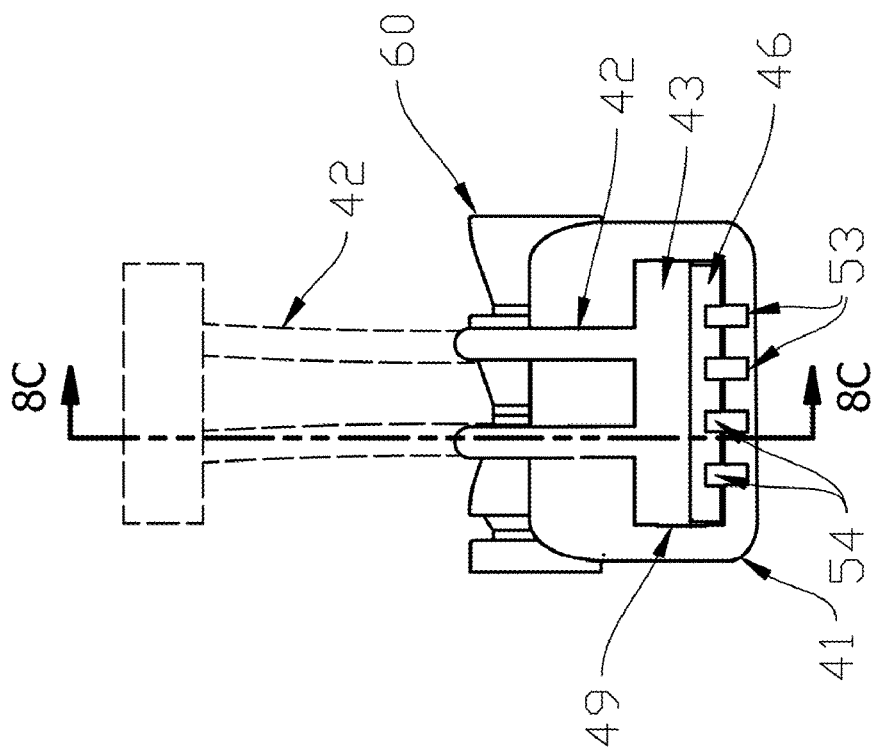
Figure 8C:
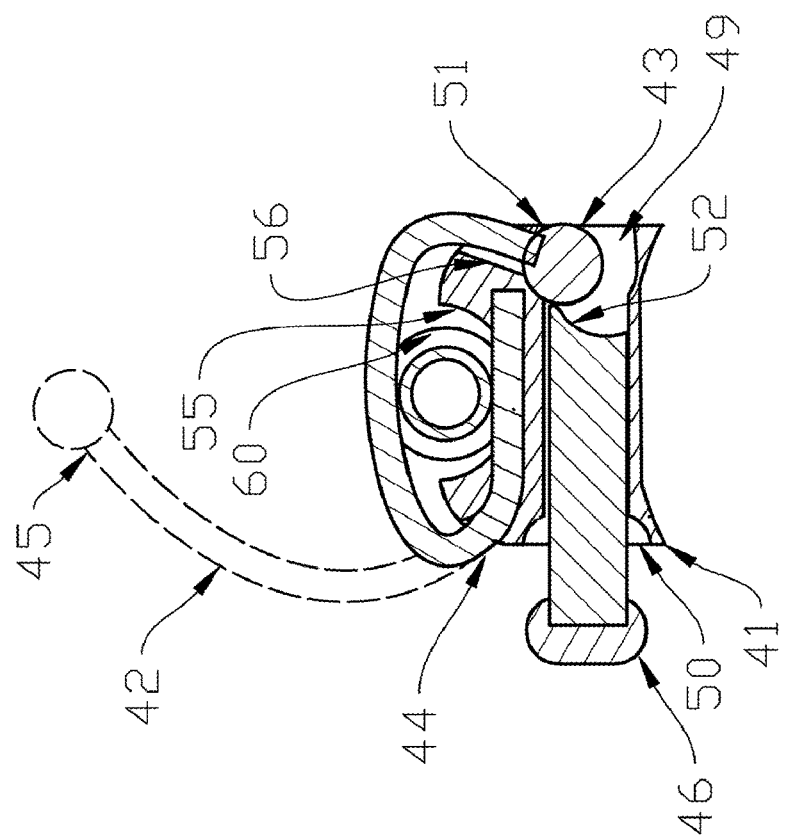
Figure 8D:
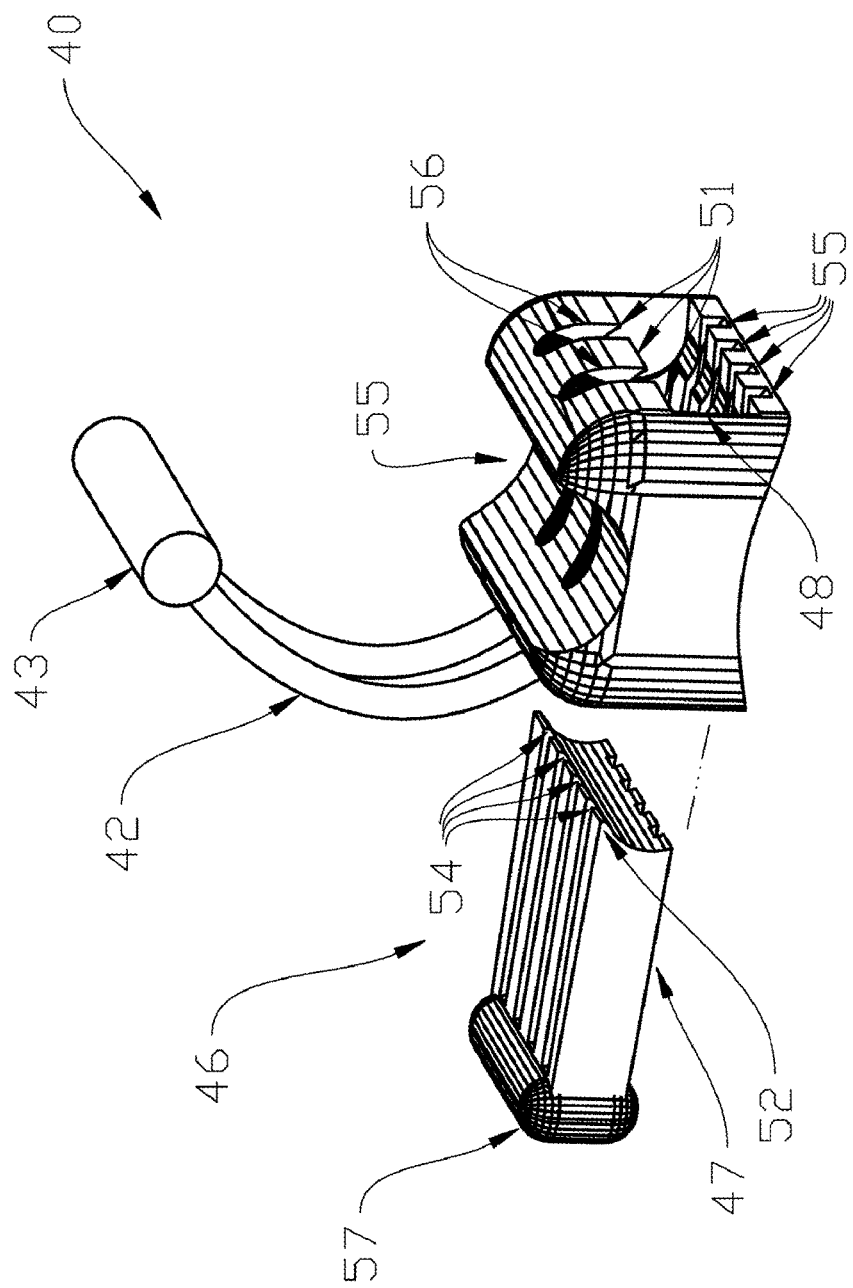

FIGS. 8A-8D depict an arm coupler 40 useful in the present invention. FIGS. 8A-8C additionally depict a portion of an arm 60 with the arm coupler. FIG. 8A is a perspective view. FIG. 8B is an elevation view. FIG. 8C is a sectioned elevation view. The section view of FIG. 8C is produced from the section line labeled "8C" in FIG. 8B. The section FIG. 8D is an exploded view. The second position of the strap 42 and pin 51 is shown in dashed lines.

The arm coupler 40 comprises an arm coupler base 41, a cord as strap 42, and a pin 43 as a strap retainer, configured to releasably secure the arm 60 to the arm coupler base. 41. The strap 42 is made from polyurethane surf leash cord such that it is resilient and bends without substantial stretching. The resting, released (i.e. unsecured) position of the strap 42 and pin 43 is shown in dashed lines. The resilient construction of the strap 42 allow it to return to the resting position, separated from the arm 60, as shown.

The strap 42 comprises a first portion 44 connected to the coupler base 41 and a second portion 45 connected to the pin 43. The pin 43 is configured to releasably connect the strap 42 to the coupler base 41.

The coupler base comprises a guide 55 configured to accept the arm. The guide 55 is a cavity that accepts and cradles the arm 60 and provides a guide and stabilizer to help the user position the arm 60 properly for coupling with the strap 42 and pin 43. As a cavity that partially surrounds the arm, the guide 55 is also configured to act in concert with the strap 42 to secure the arm when coupled, however, in contrast the concave surface 24 of the arm coupler shown in FIG. 6A, the guide 55 does not alone engage the arm 60 with sufficient force to couple the arm.

The arm coupler 40 further comprises a push button 43 that interacts with the pin 43 and can be pushed by the user to disengage the pin 43 from the coupler base 41. Specifically, coupler base 41 comprises a passageway 48 having a first end 49 and a second end 50. The pin 43 engages the coupler base 41 about the first end 49 of the passage way 48, and the push button 46 comprises pushable head 57 and a pushrod 47 that extends through the passageway 48 from the second end 50 of the passageway to the pin 43. The first end 49 of the passage way comprises a lip 51 that extends down into the passageway at the passageway mouth. One or more strap guides 56 are provided In the mouth of the first end 49 of the passage way, which allow the pin 43 to enter deeper into the passageway 48 and up behind the lip 51. As such, it is configured to retain the pin 43 in the passageway as the resilient nature of the strap 42 imparts an upward force on the pin 43 to bias the pin 43 up behind the lip 51. The pin 43 can be configured as a cross-pin (e.g. oriented sideways relative to the strap) which provides a hooking mechanism to hook around the lip 51. The coupler base 41 comprises a guide 54 configured for acceptance of the strap 42. The guide 54 comprises groove in the mouth of the first end 49 passage way. This guide 54 is configured to allow the pin 43 to enter deeper into the passageway and up further behind the lip 51 for more secure retainment of the pin 43. The pushbutton 46 comprises a wedge 52 configured to, upon the user pushing the pushbutton 52 towards the pin 43, contact the pin 43 and separate or lower the pin 43 from the lip 51 and push the pin from the first end 49 of the passageway.

Both the passageway 48 and the pushbutton 46 comprise grooves along a passageway-pushbutton interface. Specifically, passageway 48 comprises grooves 53 and pushbutton 46 comprises grooves 54 that all extend the entire length of the passageway 48. These grooves provides intermittent spacing between the passageway and the pushbutton and allow any debris such as sand that might incidentally enter the passage way to be kept away from the passageway-pushbutton interface. Such a feature prevents debris from becoming trapped in the passageway-pushbutton interface and impeding movement of the pushbutton 46 relative to the passageway 48 and jamming. As depicted, the passageway extends from one side of the arm to the other such that the first end of the passage way and the second end of the passage way are on opposite sides of the arm.

Surprisingly, such an arm coupler provides a secure, long-lasting, means for coupling the arm that can be quickly operated by the user and reduces user error in coupling and uncoupling.

Although such an arm coupler is especially useful in the present invention, the inventor also contemplates its use outside of camera supports of the invention. Accordingly, the invention contemplates such an arm coupler used in any context, for example, for coupling an arm or any first member to second member (e.g. any sporting equipment that uses buckles or couplers)

Example 8

Arm Comprising Segments and Arm Segment Joints

FIG. 9A depicts an arm useful in the present invention. The arm 60 comprises a plurality of arm segments 61 connected to each other by arm segment joints 62. The final segment of the arm is connected to elbow 67 for connection to a base mount (e.g. wrist strap). Specifically, each arm segment is a ¾ inch LOCK-LINE® segment. FIG. 9B depicts an exploded view of some of the arm segments 61. Each of the arm segments comprise a ball 63 and a socket 64 for connection to a socket 64 and a ball 63, respectively, of another arm segment. As an alternative, the arm can comprise arm segments with a ball on both ends (a male-to-male segment) or a socket on both ends (a female to female segment) for connection to another segment having the appropriate interacting fitting.

The arm segment joints are semi-secure having enough resistance to movement such that the user can apply a sufficient force to deliberately move the arm segments to shape the arm but the arm segments do not move substantially with respect to each other unintentionally during use, e.g. under the weight of the camera or while the user is moving about during a sporting event while recording himself.

Example 9

Arm Comprising Segments, Arm Segment Joints, and a Leash

FIG. 10 depicts an arm 60 useful in the present invention having a camera mount 66 attached thereto and a leash 68 running through the inside of the arm 60. Specifically, the arm 60 is an arm as detailed in Example 8. The leash 68 runs through each segment 61 from the camera mount 66 to arm joint 65 (e.g. swivel joint) that is inside just after elbow 67. An optional prong 69 extends from the arm joint 65 for connection to a base mount such as a wrist strap.

In this configuration, the leash 68 provides multiple advantages. The leash 68 provides a safety mechanism to prevent loss of a mounted camera in the event of accidental separation of the arm from the camera mount, separation of the arm from the base mount, or disassembly or damage to the arm itself. Additionally, the leash can be installed under tension to force the segments 61 against each other, thereby imparting enhanced resistance to movement of the segments 61 relative to each other about the arm segment joints 62. It was surprisingly discovered that, while the arm segment joints provide some resistance to movement, the resistance is not always sufficient to prevent unintentional movement about the joint when the camera support is in use and, additionally, wear at the joint interface as well as water seepage (e.g. while using in in water sports) can further reduce the resistance to movement of the arm segment joints. Surprisingly, a leash under tension can be used to impart a force to the arm segments that enhances the resistance to movement of the arm segments about the arm segment joints such that unintentional movement of the arm segments relative to each other is prevented, while at the same time, the user can still apply a deliberate force to move the arm segments relative to each other shape the arm as desired.

Example 10

Quick Connector

FIG. 11 depicts a quick-connector useful in the in the present invention. The quick connector comprises a prong 69 attached to the arm 60 and a slot 72 comprised by the base mount 4 (e.g. wrist strap). The slot 72 snugly accepts the prong 69. The prong has an aperture 70 and the slot 72 has an aperture 73 that can be aligned upon placing the prong 69 in the slot 72. Once the apertures 70,73 are aligned, a push pin ("peg") 74 can be inserted through both apertures to form a connection and secure the arm to the base mount. As shown, the peg 74 can be tethered to one of the components (e.g. base mount 4) to ensure the peg is not lost. The peg 74 can be a flexible member such as a plastic rope (e.g. polyurethane cord).

Such a quick connector allows the arm to be easily disconnected from the base mount. A user might desire to do so, e.g. in order to share the arm with another person without removing the base mount from the respective base. For, example, repeated mounting and unmounting of a base mount such as a wrist strap having a hook and loop connection mechanism can shorten the life of the base mount.

Example 11

Camera Support

Figure 12B:
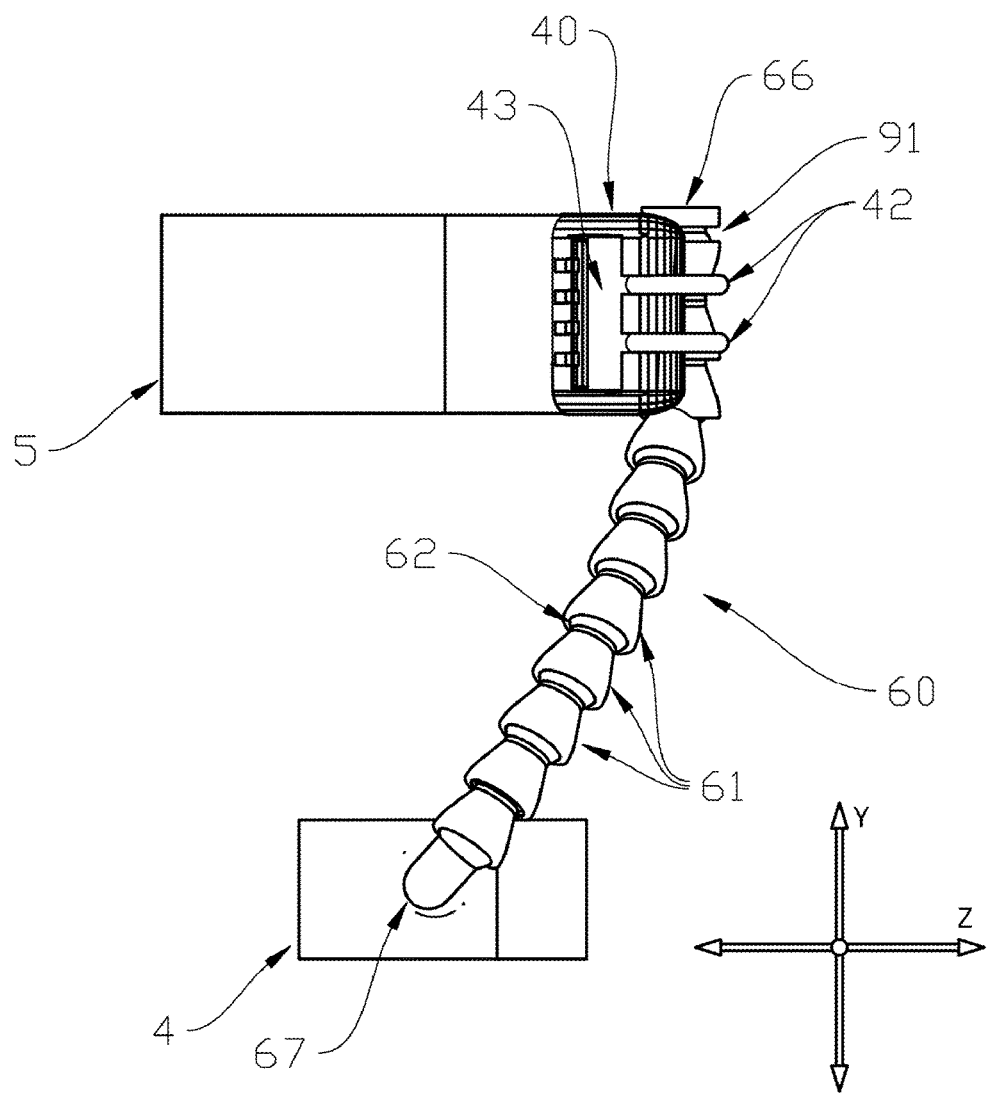
Figure 12C:
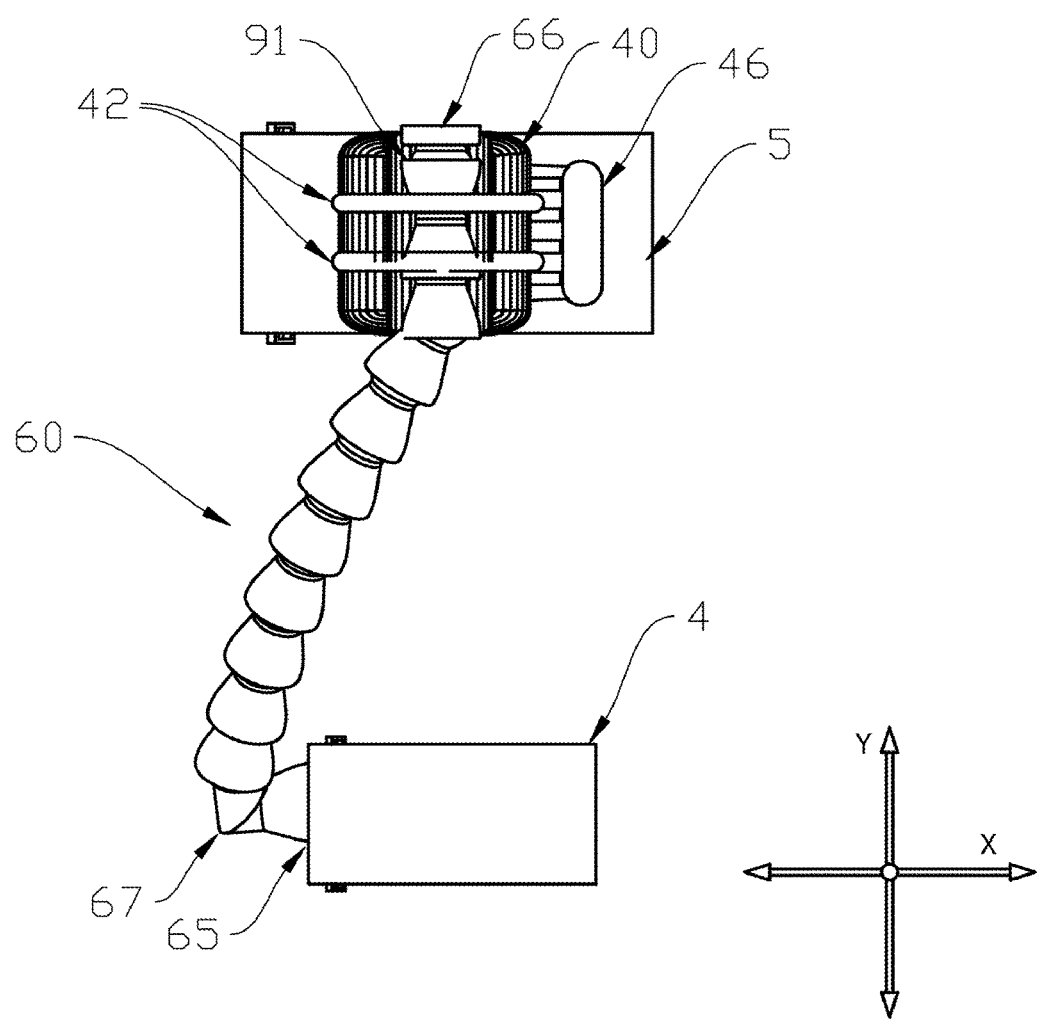
Figure 14B:
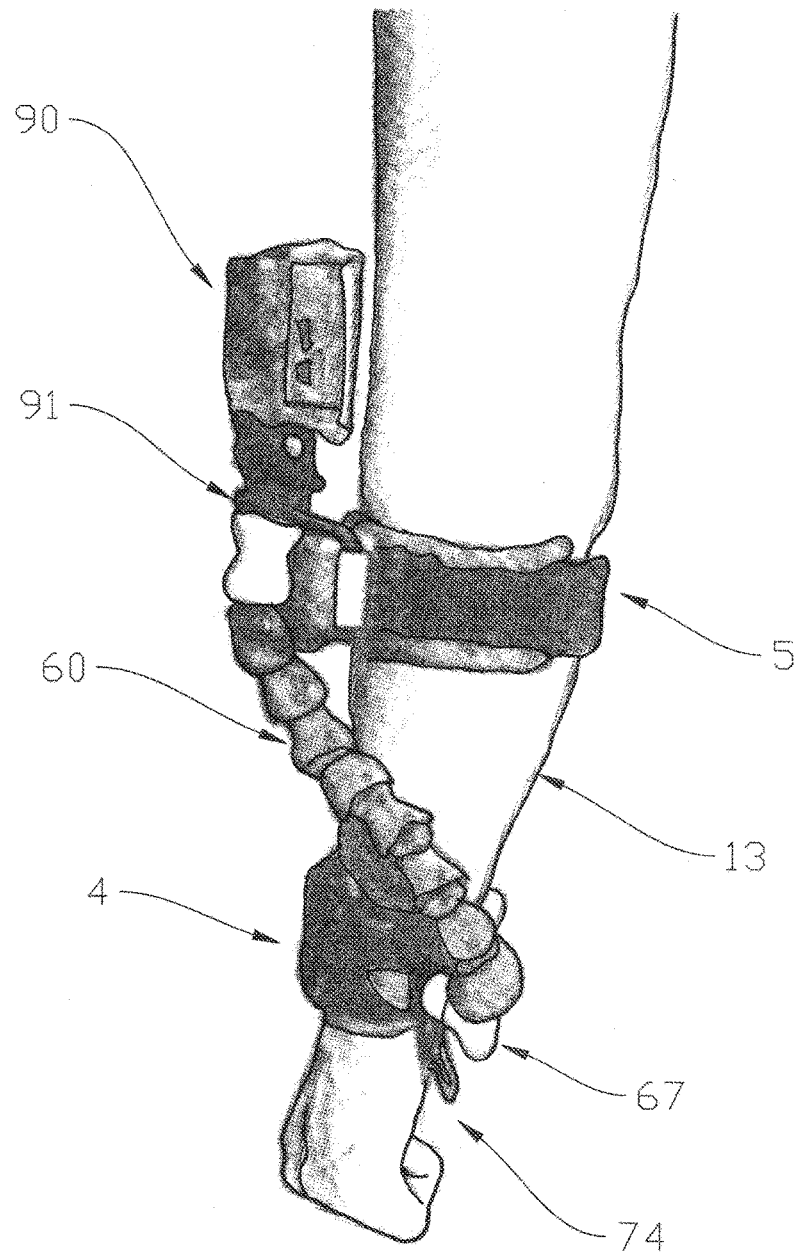
Figure 14C:
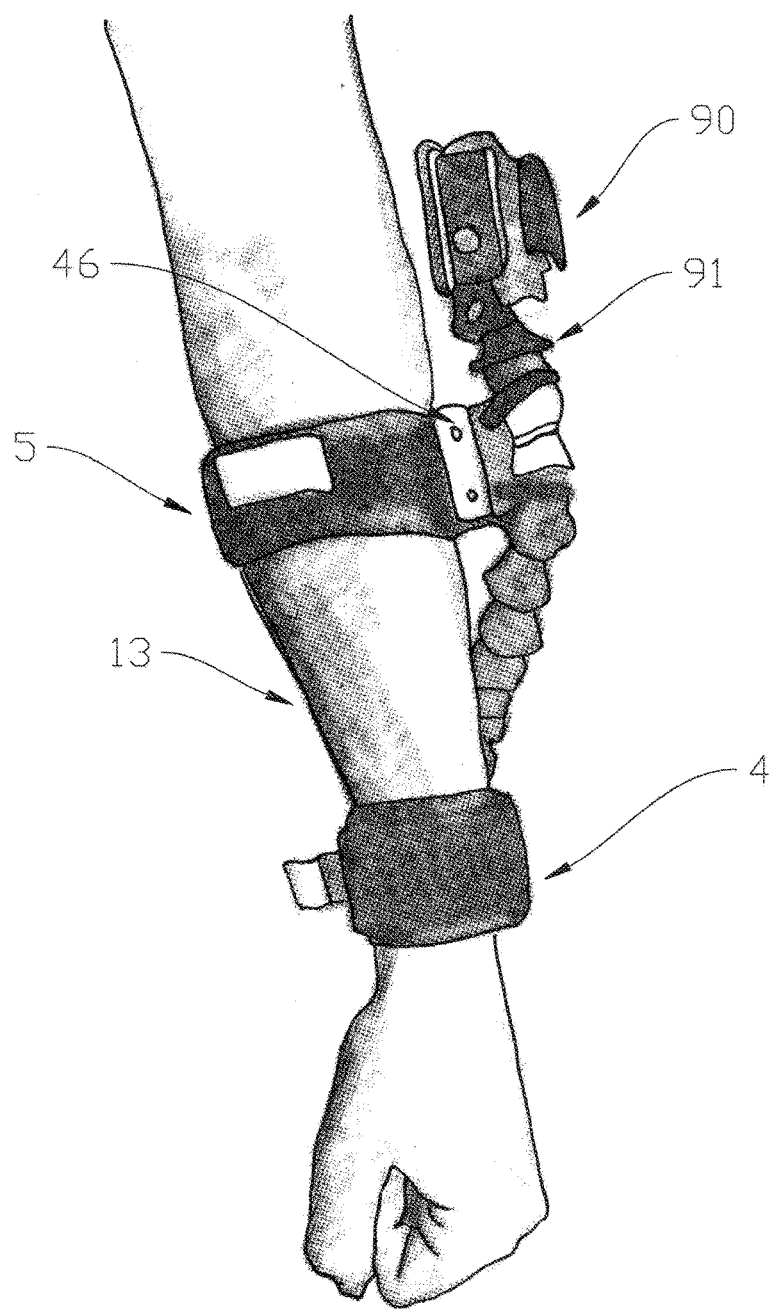
Figure 14D:
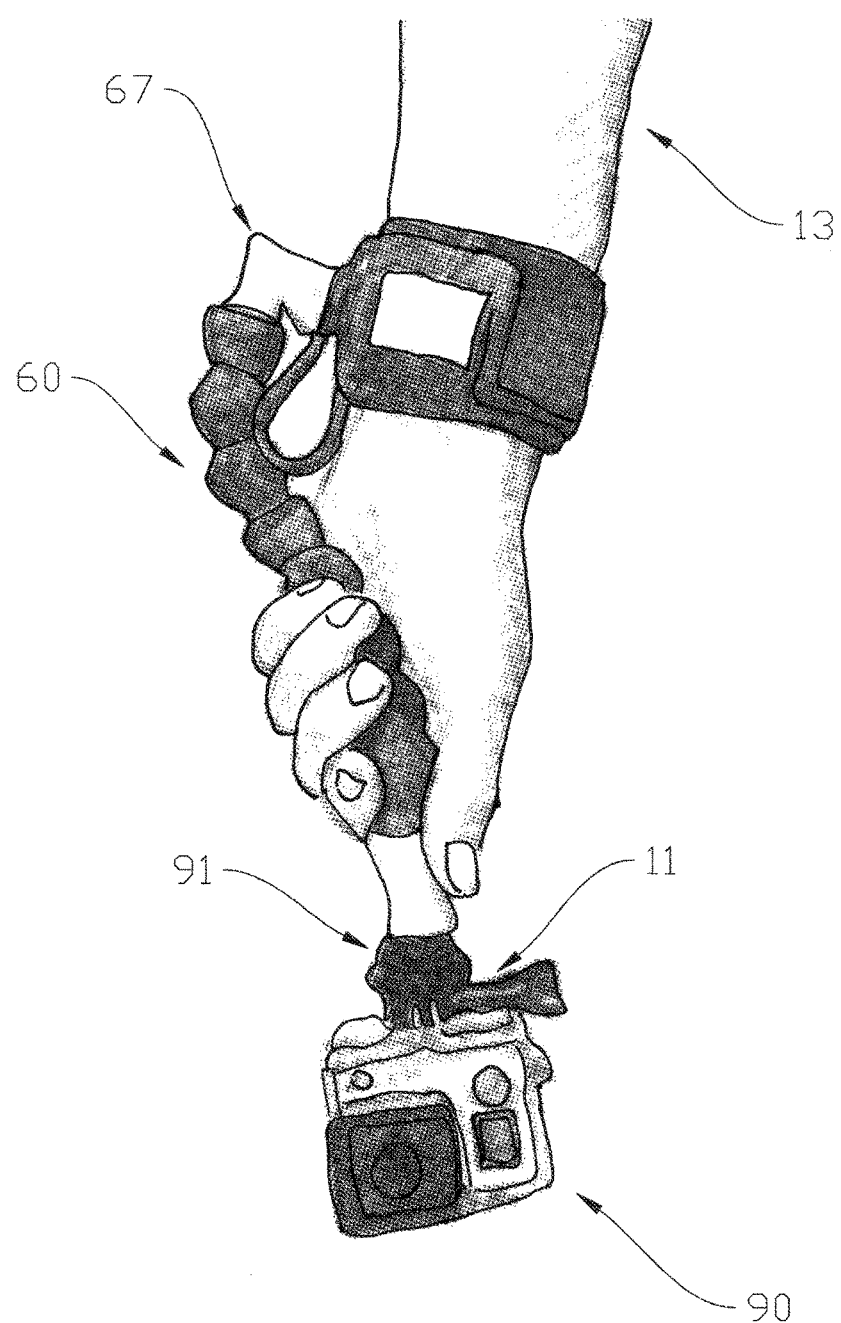

FIGS. 12A-12C depict a camera support of the invention. FIG. 14A-14D depict the camera support mounted on a forearm 13 of a user, and a camera 90 mounted to the camera support. FIG. 14A-14C depict the arm in a coupled position. FIG. 14D depicts the arm in an uncoupled position grasped by the user's hand. FIG. 14A shows the top of the forearm 13 one which the arm coupler 40 sits. FIG. 14B shows the outside of the forearm 13 to which the arm 60 is pivotally connected near elbow 67. FIG. 14C shows the inside of the forearm 13. FIG. 14D shows the underside of the forearm 13.

The camera support comprises a first base mount 4 and a second base 5, which are configured as straps for mounting to the wrist and forearm, respectively, of a user. The camera support further comprises an arm 60 comprising arm segments 61 and arm segment joints 62, as detailed in Example 8, an arm coupler 40 s detailed in Example 7, and an arm joint 65 which is a swivel joint that pivotally connects the camera mount to the first base mount 4 such that it revolves about a first axis (axis φ (phi) as shown in FIG. 2 and FIG. 3A). The camera support further comprises a camera mount 66 which is connected to the arm 60 by a semisecure swivel joint 91 (which rotates a mounted camera about axis ψ (psi) shown in FIG. 2) which is provided by a ball-in-socket with full swivel range of motion but limited tilting range of motion (e.g. using any of the camera mounts depicted in FIGS. 13A-13C which have a ball 63 connected to the camera mount). The camera mount 66 can be, e.g. a screw, a camera case, or a partial hinge, as depicted in FIGS. 13A-13C, respectively. The camera mount optionally comprises a leash (not shown) as detailed in Example 9, and a quick connector (not shown) as detailed in Example 10, and a camera mount 66.

The non-linear arm joint 60, which has a plurality of arm joints 62, allows the arm to be configured with a shape such that the first base mount 4 can be mounted to the wrist of a user and the second base mount 5 can be mounted to the upper forearm of the user, wherein the connection angle of the arm to the first base mount (which is parallel with axis X) and the connection angle of the arm to the second base mount (which is parallel with axis Z) are substantially perpendicular to each other, as shown. This allows the first base mount 4 to be mounted to the wrist of the user with the connection of the first base mount 40 to the arm 60 extending from the side of the wrist and the second base 5 mount to be mounted to the forearm of the user with the connection of the second base mount 4 to the arm 60 extending from the top of the forearm. This configuration has a superior advantage of allowing the camera, and optionally part of the arm 60, to be placed on the top of the forearm when the arm 60 is coupled to the arm coupler 40 while positioning the arm joint 65 at the side of the user's wrist (e.g. as depicted in FIG. 14A) such that the arm 60 swings into the user's hand for grasping once the arm is uncoupled from the arm coupler (e.g. as depicted in FIG. 14D). While placement of the camera on the side of the forearm has certain advantages, as detailed herein, It was surprisingly discovered that water-drag during paddling in water (e.g. while surfing) can be substantially reduced by placement of the camera on the top of the forearm. Specifically, placement of the camera on top the forearm increases hydrodynamic (i.e. the water equivalent of aerodynamics) of the forearm/camera support combination while paddling in water. This reduces interference to the user and makes wearing the camera support a much more pleasant experience for the user.

The citations provided herein are hereby incorporated by reference for the cited subject matter.

What is claimed is:

1. A camera support comprising:
a. an arm;
b. a camera mount connected to the arm;
c. a mount configured for attachment to a first supportive base ('first base mount'), wherein the arm is pivotally connected to the first base mount about a first axis;
d. a mount configured for attachment to a second supportive base ('second base mount');
e. an arm coupler configured for releasably connecting the arm to the second base mount;
f. an elbow between the first base mount and the arm; and
g. a first swivel joint between the elbow and the first base mount, wherein said first swivel joint provides said pivotal connection about the first axis;
optionally, wherein:
the first supportive base and the second supportive base are different portions of a user's limb; and
each of the first base mount and the second base mount comprises a strap configured for mounting to the respective different portion of the user's limb.

2. The camera support of claim 1, wherein the second base mount is connected to the arm at a location intermediate of the first base mount and the camera mount.

3. The camera support of claim 2, wherein the first base mount is connected to the arm at a first end of the arm and the camera mount is connected to the arm at a second end of the arm.

4. The camera support of claim 1, wherein the first base mount is movable relative to the second base mount.

5. The camera support of claim 1, further comprising a swivel joint connecting the arm to the camera mount ('camera swivel joint').

6. The camera support of claim 1, wherein the camera mount comprises a screw, a camera case, or a partial hinge.

7. The camera support of claim 1, wherein the camera mount comprises a hinge or a partial hinge or wherein the camera mount is pivotally connected to the arm by a hinge.

8. The camera support of claim 1, further comprising a leash, wherein the leash tethers the camera mount or a camera to a portion of the camera support other than the camera mount, optionally wherein the portion of the camera support is selected from the first base mount, the elbow, or the second base mount.

9. The camera support of claim 8, wherein:
a. the arm is a tubular arm; and
b. the leash runs through the arm.

10. The camera support of claim 1, wherein the arm coupler comprises a clip, a magnet, a strap, or a combination thereof.

11. The camera support of claim 1, wherein:
the first supportive base and the second supportive base are different portions of a user's limb; and
each of the first base mount and the second base mount comprises a strap configured for mounting to the respective different portion of the user's limb.

12. A camera support comprising:
a. an arm;
b. a camera mount connected to the arm;
c. a mount configured for attachment to a first supportive base ('first base mount'), wherein the arm is pivotally connected to the first base mount about a first axis;
d. a mount configured for attachment to a second supportive base ('second base mount');
e. an arm coupler configured for releasably connecting the arm to the second base mount;
f. an arm coupler base, wherein the coupler base comprises a guide configured to accept the arm ('arm guide'); and
g. a strap configured to releasably secure the arm to the arm coupler base, optionally wherein the strap is a resilient strap;
optionally, wherein:
the first supportive base and the second supportive base are different portions of a user's limb; and
each of the first base mount and the second base mount comprises a strap configured for mounting to the respective different portion of the user's limb.

13. The camera support of claim 12, wherein:
a. the arm coupler comprises a strap retainer pin;
b. the strap comprises a first portion connected to the arm coupler base and a second portion connected to the strap retainer pin;
c. the strap retainer pin is configured to releasably connect the strap to the coupler base; and
d. the arm coupler comprises a push button that interacts with the strap retainer pin and can be pushed by the user to disengage the strap retainer pin from the coupler base.

14. The camera support of claim 12, wherein:
the first supportive base and the second supportive base are different portions of a user's limb; and
each of the first base mount and the second base mount comprises a strap configured for mounting to the respective different portion of the user's limb.

15. A camera support comprising:
a. an arm;
b. a camera mount connected to the arm;
c. a mount configured for attachment to a first supportive base ('first base mount'), wherein the arm is pivotally connected to the first base mount about a first axis;
d. a mount configured for attachment to a second supportive base ('second base mount'); and
e. an arm coupler configured for releasably connecting the arm to the second base mount;
wherein:
the arm is non-linear;
the arm comprises a plurality of arm segments connected to each other by a respective at least one arm segment joint, wherein the at least one arm segment joint is a secure joint or a semisecure joint; and the arm is shaped such that it can extend from the first base mount to the second base mount when:
  a. the first base mount is mounted to the wrist of the user with the connection of the first base mount to the arm extending from the side of the wrist; and
  b. the second base mount is mounted to the forearm of the user with the connection of the second base mount to the arm extending from the top of the forearm;
optionally, wherein:
  the first supportive base and the second supportive base are different portions of a user's limb; and
  each of the first base mount and the second base mount comprises a strap configured for mounting to the respective different portion of the user's limb.

16. The camera support of claim 15, wherein:
  the first supportive base and the second supportive base are different portions of a user's limb; and
  each of the first base mount and the second base mount comprises a strap configured for mounting to the respective different portion of the user's limb.

17. A camera support comprising:
  a. an arm;
  b. a camera mount connected to the arm;
  c. a mount configured for attachment to a first supportive base ('first base mount'),
  d. a mount configured for attachment to a second supportive base ('second base mount'); and
  e. a coupler configured for releasably connecting the arm to the second base mount ('arm coupler');
  f. a first joint between the arm and the first base mount, wherein:
  the arm is pivotally connected to the first base mount such that the camera mount revolves about the first base mount;
  the first supportive base and the second supportive base are different portions of a user's limb;
  each of the first base mount and the second base mount comprises a strap configured for mounting to the respective different portion of the user's limb; and
  optionally, the camera support comprises an elbow connecting the arm to the first joint and the first joint comprises a swivel joint connecting the elbow to the first base mount, wherein the swivel joint provides said pivotal connection of the arm to the first base mount.

18. The camera support of claim 17, further comprising a swivel joint connecting the arm to the camera mount ('camera swivel joint').

19. The camera support of claim 18, wherein:
  a. the camera mount comprises a hinge or a partial hinge or the camera mount is pivotally connected to the arm by a hinge; and
  b. the swivel joint can impart movement about an axis that is different than an axis of movement that can be imparted by said hinge comprised by the camera mount, said partial hinge comprised by the camera mount, or said hinge pivotally connecting the camera mount to the arm.

20. The camera support of claim 19, wherein the camera support comprises the elbow connecting the arm to the first joint and the first joint comprises the swivel joint connecting the elbow to the first base mount, wherein the swivel joint provides said pivotal connection of the arm to the first base mount.

21. The camera support of claim 17, wherein the arm comprises a plurality of arm segments connected to each other by at least one arm segment joint that is a secure joint or a semisecure joint.

22. The camera support of claim 17, wherein the camera support comprises the elbow connecting the arm to the first joint and the first joint comprises the swivel joint connecting the elbow to the first base mount, wherein the swivel joint provides said pivotal connection of the arm to the first base mount.

* * * * *